(12) United States Patent
Imai et al.

(10) Patent No.: US 10,077,357 B2
(45) Date of Patent: *Sep. 18, 2018

(54) PRODUCTION METHOD FOR READILY DISPERSIBLE CELLULOSE COMPOSITION, READILY DISPERSIBLE CELLULOSE COMPOSITION, CELLULOSE DISPERSION RESIN COMPOSITION, AND PRODUCTION METHOD FOR WATER-BASED DISPERSANT FOR CELLULOSE

(71) Applicants: DAINICHISEIKA COLOR & CHEMICALS MFG. CO., LTD., Tokyo (JP); KYOTO UNIVERSITY, Kyoto (JP)

(72) Inventors: Takahiro Imai, Tokyo (JP); Taiyo Aoyagi, Tokyo (JP); Hiroyuki Shimanaka, Tokyo (JP); Yoshinobu Tsujii, Kyoto (JP); Keita Sakakibara, Kyoto (JP); Atsushi Goto, Kyoto (JP)

(73) Assignees: DAINICHISEIKA COLOR & CHEMICALS MFG. CO., LTD., Tokyo (JP); KYOTO UNIVERSITY, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/125,868

(22) PCT Filed: Mar. 30, 2015

(86) PCT No.: PCT/JP2015/060029
§ 371 (c)(1),
(2) Date: Sep. 13, 2016

(87) PCT Pub. No.: WO2015/152189
PCT Pub. Date: Oct. 8, 2015

(65) Prior Publication Data
US 2017/0002182 A1  Jan. 5, 2017

(30) Foreign Application Priority Data
Mar. 31, 2014 (JP) ................................. 2014-072483

(51) Int. Cl.
| | |
|---|---|
| *C08L 1/02* | (2006.01) |
| *C08J 3/05* | (2006.01) |
| *C08F 293/00* | (2006.01) |
| *C08L 101/00* | (2006.01) |
| *C08K 5/17* | (2006.01) |
| *C08K 5/42* | (2006.01) |
| *C08L 23/06* | (2006.01) |

(52) U.S. Cl.
CPC .............. *C08L 1/02* (2013.01); *C08F 293/00* (2013.01); *C08J 3/05* (2013.01); *C08K 5/175* (2013.01); *C08K 5/42* (2013.01); *C08L 23/06* (2013.01); *C08L 101/00* (2013.01); *C08J 2301/02* (2013.01); *C08J 2323/06* (2013.01); *C08J 2401/02* (2013.01); *C08J 2453/00* (2013.01)

(58) Field of Classification Search
CPC .............. B01F 17/0028; C08F 293/005; C08F 297/04; C08G 81/021; C08J 3/05; C08J 3/20
USPC ...................................... 524/35; 525/94, 297
See application file for complete search history.

(56) References Cited

FOREIGN PATENT DOCUMENTS

| | | |
|---|---|---|
| JP | 2002146116 | 5/2002 |
| JP | 2008266630 | 11/2008 |
| JP | 2009138024 | 6/2009 |
| WO | 2012111408 | 8/2012 |
| WO | 2014133019 | 9/2014 |

(Continued)

OTHER PUBLICATIONS

U.S. Appl. No. 15/125,856, filed 2016.*

(Continued)

*Primary Examiner* — Edward J Cain
(74) *Attorney, Agent, or Firm* — Hamre, Schumann, Mueller & Larson, P.C.

(57) ABSTRACT

An object of the present invention is to provide a technology of dispersing cellulose readily in a hydrophobic substance such as a resin by treating cellulose being a hydrophilic substance in a system that contains water as a main medium with a polymer dispersant, which has been developed for dispersing a fine and hydrophobic substance such as a pigment, in a simple and efficient manner without conducting surface modification of nanocellulose or other treatments. The object is solved by a process for producing a readily dispersible cellulose composition, the process including dissolving a polymer dispersant having a block copolymer structure having a resin-affinitive segment A and a cellulose-adsorptive segment B in a hydrophilic organic solvent solution, adding a surface active agent to the resultant solution, thereafter adding water to the resultant mixture to prepare an aqueous dispersion treatment agent containing the polymer dispersant, and adding the obtained aqueous dispersion treatment agent to cellulose in a water-containing state or in a dry state, thereby obtaining a readily dispersible cellulose composition. The object is also solved by a process for producing an aqueous dispersion treatment agent for use in the process for producing a readily dispersible cellulose composition, the readily dispersible cellulose composition, and a cellulose-dispersed resin composition using the readily dispersible cellulose composition.

12 Claims, No Drawings

(56) References Cited

FOREIGN PATENT DOCUMENTS

| WO | 2015152188 | 10/2015 |
|---|---|---|
| WO | 2015152189 | 10/2015 |

OTHER PUBLICATIONS

Extended European Search Report, issued in the corresponding European patent application 15773988.9, dated Nov. 30, 2017, 8 pages.
Heux et al., "Nonflocculating and Chiral-Nematic Self-ordering of Cellulose Microcrystals Suspensions in Nonpolar Solvents", Langmuir, vol. 16, No. 21, 2000, pp. 8210-8212.
Ljungberg et al., "Nanocomposites of isotactic polypropylene reinforced with rod-like cellulose whiskers", Polymer, vol. 47, 2006, pp. 6285-6292.
Results report, "Development of Polymer Dispersant", NEDO 2013, pp. 39-42.
Sakakibara et al., "Application to a Resin Composite Material of the Polymer Dispersant Suitable for Cellulose Nanofiber", Preprints of the Society of Fiber Science and Technology, vol. 68, No. 1, 2013, p. 2H15.
Sakakibara et al., "Plastic Materials Reinforced with Cellulose Nanofibers Using Polymer Dispersant" Preprints of Seikei-Kakou Annual Meeting vol. 24, 2013, pp. 119-120.
Sakakibara et al., "Preparation of Cellulose Nanofiber / Resin composite Materials by Using Di-block Copolymers", Preprints of 2013 Cellulose R&D The 20th Annual Meeting, 2013, p. 67.
Sakakibara et al., "Performance and Structural Evaluation of Cellulose Nanofiber-Reinforced Resin Composite Material Using the Polymer Dispersant" Preprints of the Society of Fiber Science and Technology, vol. 68, No. 2, 2013, p. 72.
Sakakibara et al., "Cellulose Nanofiber-Based Composite Materials with Polymer Brush Components" Sen'i Gakkaishi, vol. 70, No. 8, 2014, pp. 276-280.
Sakakibara et al., "Polymer Dispersants for Cellulose Nanofiber Reinforced Polyolefin Composite Materials", Function & Materials, vol. 34, No. 11, 2014, pp. 40-45.
Tsujii, "Application to the interface function control and a resin composite materials of wood derived from the NC by the polymer dispersant", Nanocellulose Symposium, 2015, pp. 59-62.
International Search Report, issued in the corresponding International Application No. PCT/JP2015/060029, dated Jun. 16, 2015, 4 pages.
International Search Report, issued in the International Application No. PCT/JP2015/060028, dated Jun. 16, 2015, 5 pages, which corresponds to the U.S. Appl. No. 15/125,856.
Extended European Search Report, issued in the European patent application 15773476.5, dated Nov. 30, 2017, 7 pages, which corresponds to the U.S. Appl. No. 15/125,856.

\* cited by examiner

PRODUCTION METHOD FOR READILY DISPERSIBLE CELLULOSE COMPOSITION, READILY DISPERSIBLE CELLULOSE COMPOSITION, CELLULOSE DISPERSION RESIN COMPOSITION, AND PRODUCTION METHOD FOR WATER-BASED DISPERSANT FOR CELLULOSE

TECHNICAL FIELD

The present invention relates to a novel technology that can realize widespread utilization of a fine cellulose fiber whose function as an excellent filler has received a lot of attention but whose utilization is not facilitated under the present circumstances because the fine cellulose fiber is a hydrophilic substance and therefore is hard to disperse in resins or other materials. Specifically, the present invention relates to a technology that provides: a process for producing readily dispersible cellulose composition in which the dispersibility of cellulose in a resin is improved by treating cellulose with a polymer dispersant; a process for producing an aqueous dispersion treatment agent for use in producing the readily dispersible cellulose composition; a readily dispersible cellulose composition; and a cellulose-dispersed resin composition using the readily dispersible cellulose composition.

BACKGROUND ART

A Cellulose fiber is a substance having a basic skeleton of all the plants, is accumulated on the earth in an amount exceeding one trillion tons, and is a resource that is renewable by planting trees, and therefore effective utilization thereof is desired. Although the weight is one fifth of that of steel, the cellulose fiber has strength five times stronger than steel and a low linear thermal expansion coefficient as low as 1/50 of glass fiber. Thus, a technology in which cellulose fiber is contained as a filler in a matrix of a resin or the like to impart mechanical strength to the resin is proposed (Patent Literature 1). Moreover, in order to further improve the mechanical strength of a cellulose fiber, there is a proposal on a fibrous resin reinforcing agent in which the cellulose fiber is defibrated so that a cellulose nanofiber (CNF or microfibrillated plant fiber) may be present in a dispersed state in an additive (Patent Literature 2). Furthermore, as a material obtained by subjecting a cellulose fiber to defibration treatment in the same manner as in producing the CNF, a cellulose nanocrystal (CNC) is known. The CNF is a fiber that is obtained by subjecting a cellulose fiber to defibration treatment such as mechanical defibration and that has a fiber width of about 4 to about 100 nm and a fiber length of about 5 μm or more. The CNC is a crystal that is obtained by subjecting a cellulose fiber to chemical treatment such as acid hydrolysis and that has a crystal width of about 10 to about 50 nm and a crystal length of about 500 nm. These CNF and CNC are collectively called as nanocellulose. Nanocellulose has a high specific surface area (250 to 300 $m^2/g$) and has a lighter weight and a higher strength when compared with steel.

The thermal deformation of nanocellulose is smaller when compared with that of glass. Nanocellulose having a high strength and a low thermal expansion is a useful material as a sustainable type resource material, and creation and development of, for example, a composite material achieving a high strength and a low thermal expansion by combination of nanocellulose and a polymer material such as a resin; an aerogel material; an optically anisotropic material making use of a chiral nematic liquid crystal phase formed by self-organization of CNC; and a high-functional material obtained by introducing a functional group into nanocellulose have been made. On the other hand, nanocellulose plentifully has hydroxy groups and therefore is hydrophilic and strongly polar, which makes nanocellulose inferior in compatibility with general purpose resins that are hydrophobic and nonpolar. Therefore, in the material development using nanocellulose, studies have been conducted on improving the compatibility of nanocellulose with general purpose resins by modifying the surface of nanocellulose or introducing a functional group into nanocellulose through chemical treatment. That is to say, studies on improving dispersibility of nanocellulose to general purpose resins have been conducted.

Moreover, in the preparation of a general purpose resin composition containing a cellulose fiber as a filler, studies have been conducted on improving the dispersibility and compatibility of a cellulose fiber with general purpose resins by adding a dispersant. In Non Patent Literature 1, the dispersibility of a cellulose nanocrystal (cellulose nanowhisker) inorganic solvents is improved by adsorbing a surface active agent to the cellulose nanocrystal. In Non Patent Literature 2, an isotactic polypropylene (iPP) composite material is prepared using, as a reinforcing material, a cellulose nanocrystal to which a surface active agent is adsorbed and the tensile strength of the composite material is improved about 1.4 times stronger than that of the iPP alone. In Patent Literature 2, when cellulose is utilized as a reinforcing material for a thermoplastic resin, an additive (low-molecular weight surface active agent) having affinity to a cellulose fiber and having a particular HLB (hydrophile-lipidophile balance) value is used to create a state in which the cellulose fiber is dispersed in the additive for the purpose of suppressing the occurrence of cellulose aggregates and uniformly dispersing cellulose in a resin.

CITATION LIST

Patent Literature

Patent Literature 1: Japanese Patent Laid-Open No. 2008-266630
Patent Literature 2: International Publication No. WO2012111408

Non Patent Literature

Non Patent Literature 1: Heux et al., Langmuir, vol. 16, No. 21, 2000, 8210-8212
Non Patent Literature 2: Ljungberg et al., Polymer, vol. 47, 2006, 6285-6292

SUMMARY OF INVENTION

Technical Problem

In any of the above-described conventional examples, tries to improve the dispersibility of nanocellulose by using a low-molecular weight compound as a dispersant have been made. On the other hand, the present inventors have recognized that it is extremely useful for putting a polymer dispersant into practical use that the polymer dispersant, which has been developed for dispersing a fine and hydrophobic substance such as a pigment in a resin or an aqueous medium, can be applied to cellulose being a hydrophilic substance in a simple manner and in an environmentally conscious manner that never uses a large amount of organic solvents. It is considered herein to have technical advantages as listed below that a polymer dispersant can be used for dispersing cellulose in general purpose resins. First of all, polymers having wide variety of structures can be designed according to monomer design, and therefore molecules can be designed according to the purposes and applications. That is to say, numerous structures as polymer dispersants can be designed and therefore synthesis of higher-performance dispersants, which are fitted to the kinds or other properties of resins to be dispersed, according to molecular design can be expected. It is considered that various kinds of polymers such as olefin-based polymers, acrylic-based polymers, ester-based polymers, and urethane-based polymers can be used as the polymer dispersant. Among the polymers, it is anticipated that acrylic-based polymers in particular are more useful because the acrylic-based monomers are polymerizable under a calm condition to give polymers in a relatively easy manner and wide variety of acrylic-based monomers exist, making molecular design according to the purposes and applications easy by selecting a target composition from among numerous compositions.

Further, in the case where the acrylic-based polymer is used as the polymer dispersant, it is considered to be useful that the structure of the polymer dispersant is a block copolymer structure from the following reason. The block copolymer has a structure in which two kinds or more of polymer segments each having different constituents are included in one polymer chain and therefore has an advantage in that different functionalities can be imparted to respective polymer segments by devising monomer compositions. For example, to take an A-B type block copolymer consisting of a chain A and a chain B each having a different monomer composition (different monomer components) as an example, when the A-B block copolymer can be designed so that the polymer segment A (chain A) may have a component that has a high affinity to general purpose resins and the polymer segment B (chain B) may have a component that has a high adsorptivity to cellulose, it is considered that the chain A and chain B act effectively to general purpose resins and cellulose respectively by making use of the copolymer as a dispersant, and therefore suppression of aggregation of cellulose and stabilization of dispersion of cellulose in general purpose resins can be expected. That is to say, in the case where an A-B block copolymer having a resin-affinitive segment A and a cellulose-adsorptive segment B is used as a dispersant for a cellulose-dispersed resin composition, the dispersibility of cellulose becomes favorable and sufficient enhancement of the mechanical strength can be expected for the A-B block copolymer as a filler.

The present inventors have considered that a process for treating cellulose with a polymer dispersant becomes important in order for the polymer dispersant to exhibit its functions sufficiently. As disclosed in the above-described technologies, suppressing the occurrence of cellulose aggregates in the dispersion of cellulose with a polymer dispersant is a prerequisite for achieving favorable dispersion. Therefore, as a pretreatment process for obtaining a cellulose-dispersed resin composition with which a favorable dispersion state is achieved, it becomes important how successfully cellulose can be treated with a polymer dispersant without causing the aggregation of cellulose. For example, as a specific process, in the case where cellulose is treated with a water-insoluble acrylic polymer as a polymer dispersant, it is considered that a step of dissolving the polymer dispersant in an organic solvent and then adding the resultant solution to cellulose is required because the polymer dispersant is water-insoluble. However, in the case where a polymer dispersant dissolved in an organic solvent is added to such cellulose in a water-containing state, there is a risk that the polymer dispersant is precipitated due to the existence of water and does not act effectively to cellulose. On the other hand, in the case where a polymer dispersant is added to cellulose in a state where an organic solvent, not water, which dissolves the polymer dispersant is contained therein, cellulose can be treated with the polymer dispersant without causing precipitation, however another problem arises, so that removing a large amount of the organic solvent by filtration, drying, or other methods becomes necessary. Moreover, in this case, since cellulose has a lot of hydroxy groups and has a strong hydrophilicity, there is also a risk, in addition to the above-described risk, that aggregation of cellulose occurs because of the contained organic solvent and sufficient dispersion of cellulose is not obtained. Thus, the development of such a process that can make the amount of organic solvents used small, and that can treat cellulose simply and effectively in a system containing water as the main component to make cellulose readily dispersible to resins is desired.

The present invention has been completed in consideration of the background, and an object of the present invention is to provide a readily dispersible cellulose composition: that can make the dispersion with a polymer dispersant that has conventionally been developed for dispersing a fine and hydrophobic substance such as a pigment applicable to cellulose being a hydrophilic substance by a simple process without conducting surface modification of nanocellulose or introduction of a functional group to nanocellulose as has been conducted in conventional technologies; and that is capable of simply and effectively treating cellulose with a polymer dispersant in a system containing water as the main component without using a large amount of organic solvents and is capable of dispersing cellulose readily in hydrophobic substances such as resins. Furthermore, another object of the present invention is to make it possible to provide a useful cellulose-dispersed resin composition using the readily dispersible cellulose composition.

Solution to Problem

The present inventors have conducted diligent studies in order to solve the problems to find a process for obtaining a readily dispersible cellulose composition by an extremely simple process without using a large amount of organic solvents, the readily dispersible cellulose composition: that is necessary for obtaining a cellulose-dispersed resin composition with a polymer dispersant; and that makes cellulose readily dispersible in a hydrophobic substance such as a resin. The present inventors have further found that the process can make polymer dispersants applicable to cellulose being a hydrophilic substance to obtain a favorable cellulose-dispersed resin composition while the occurrence of cellulose aggregates is suppressed. In this way, the present inventors have reached the present invention.

The objects are achieved by the present invention described below. That is to say, the present invention provides a process for producing a readily dispersible cellulose composition having an improved dispersibility of cellulose in a resin, the process including: dissolving a polymer dispersant having a block copolymer structure having a resin-affinitive segment A and a cellulose-adsorptive segment B in a hydrophilic organic solvent solution; adding a surface active agent to the resultant solution; thereafter adding water to the resultant mixture to prepare an aqueous dispersion treatment agent containing the polymer dispersant; and adding the obtained aqueous dispersion treatment agent to cellulose in a water-containing state or in a dry state, thereby obtaining a readily dispersible cellulose composition.

Preferred embodiments of the process for producing a readily dispersible cellulose composition include the following embodiments: the surface active agent is at least any one selected from the group consisting of a carboxylic acid salt, an inorganic acid salt, and a quaternary ammonium salt of aliphatic amines; the hydrophilic organic solvent is an alcohol-based or glycol-based solvent; the cellulose is at least one cellulose fiber in a water-containing state or in a dry state selected from the group consisting of a cellulose nanofiber, a cellulose nanocrystal, pulp, lignocellulose, and wood flour.

Moreover, preferred embodiments of the process for producing a readily dispersible cellulose composition include the process for producing a readily dispersible cellulose composition in which the polymer dispersant is a block copolymer satisfying all of the following requirements (1) to (5):
(1) 90% by mass or more of constituents of the A-B block copolymer is constituted by a methacrylate-based monomer or methacrylate-based monomers;
(2) 50% by mass or more of constituents of the cellulose-adsorptive segment B is constituted by a methacrylate-based monomer having one or more hydroxy groups and/or a methacrylate-based monomer having a urea group, and the cellulose-adsorptive segment B does not have compatibility with resins;
(3) the resin-affinitive segment A has a number average molecular weight of 500 to 20000 in terms of polystyrene in gel permeation chromatography, and a ratio of the resin-affinitive segment A in the whole A-B block copolymer is 5 to 95% by mass;
(4) the cellulose-adsorptive segment B has a number average molecular weight of 500 to 20000 in terms of polystyrene in gel permeation chromatography, and a ratio of the cellulose-adsorptive segment B in the whole A-B block copolymer is 5 to 95% by mass; and
(5) the A-B block copolymer has a number average molecular weight of 1000 to 40000 in terms of polystyrene in gel permeation chromatography and a molecular weight distribution index (weight average molecular weight/number average molecular weight) of 1.0 to 1.6.

Furthermore, the preferred embodiments of the process for producing a readily dispersible cellulose composition include the process for producing a readily dispersible cellulose composition in which the constitution of the polymer dispersant is such that, in the requirement (2), 70% by mass or more of the constituents of the cellulose-adsorptive segment B is constituted by a methacrylate-based monomer having one or more hydroxy groups and/or a methacrylate-based monomer having a urea group, and 3 to 15% by mass of the constituents of the cellulose-adsorptive segment B is constituted by a methacrylic acid neutralized with an alkali and/or a methacrylate-based monomer having a carboxy group neutralized with an alkali, or constituted by a methacrylate-based monomer having a quaternary ammonium salt group.

Moreover, the preferred embodiments of the process for producing a readily dispersible cellulose composition include the process for producing a readily dispersible cellulose composition in which the polymer dispersant is synthesized through a reversible chain transfer catalyzed polymerization (RTCP) method being a living radical polymerization method: using an organic iodine compound as an initiation compound; and using a phosphorus compound, a nitrogen compound, an oxygen compound, or a carbon compound as a catalyst.

Moreover, the present invention provides, as another embodiment, a readily dispersible cellulose composition obtained by any of the above-described processes for producing a readily dispersible cellulose composition.

Moreover, the present invention provides, as yet another embodiment, a cellulose-dispersed resin composition obtained through melt-kneading of a resin composition containing the readily dispersible cellulose composition and a resin. Preferred embodiments thereof include: the cellulose-dispersed resin composition in which the resin composition is obtained through melt-kneading conducted in a state where a liquid component derived from the readily dispersible cellulose composition is contained; and the cellulose-dispersed resin composition in which the resin is a thermoplastic resin.

Moreover, the present invention provides, as still yet another embodiment, a process for producing an aqueous dispersion treatment agent for use in producing a readily dispersible cellulose composition having an improved dispersibility of cellulose in a resin, the process including: dissolving a polymer dispersant having a block copolymer structure having a resin-affinitive segment A and a cellulose-adsorptive segment B in a hydrophilic organic solvent solution; adding a surface active agent to the resultant solution; and thereafter adding water to the resultant mixture, thereby producing an aqueous dispersion treatment agent containing the polymer dispersant.

Advantageous Effects of Invention

According to the present invention, an aqueous dispersion treatment agent for cellulose: which is useful for obtaining a cellulose-dispersed resin composition in which cellulose is favorably dispersed in a resin; which can make the amount of organic solvents to be used small by a simple process; and which makes it possible to treat cellulose with a polymer dispersant in a system containing water as the main component is provided. Further, according to the present invention, a readily dispersible cellulose composition is provided. More specifically, an aqueous dispersion treatment agent which contains a polymer dispersant and which is useful as a dispersant for cellulose can stably be prepared by a simple process using a surface active agent. The aqueous dispersion treatment agent is useful because the aqueous dispersion treatment agent can be used irrespective of whether the cellulose is in a water-containing state or in a dry state. That is to say, according to the present invention, a step of treating cellulose being a hydrophilic substance with a polymer dispersant that has conventionally been applied to hydrophobic pigments or other materials can be conducted using water as the main component, cellulose can be treated with a polymer dispersant while the aggregation of cellulose caused by an organic solvent is suppressed, and a readily dispersible cellulose composition can be provided in a simple and efficient manner. As a result, it is made possible to realize widespread utilization of a fine cellulose fiber, which is a renewable natural material and the function of which as an excellent filler has received a lot of attention but the utilization of which is not facilitated under the present circumstances because the fine cellulose fiber is a hydrophilic substance and therefore is hard to disperse in thermoplastic resins being general purpose resins, or other materials.

DESCRIPTION OF EMBODIMENTS

Hereinafter, the present invention will be described in more detail giving the best mode for carrying out the present invention.

The feature of the present invention is in that a simple pretreatment process is found, the pretreatment process: being necessary for obtaining a cellulose-dispersed resin composition with a polymer dispersant; and being capable of providing a readily dispersible cellulose composition by which the dispersibility of cellulose in a resin is made favorable by a polymer dispersant. Specifically, the present invention has a major feature in that, in the case where water is added to a hydrophilic organic solvent solution containing: a polymer dispersant having a particular block copolymer structure; and a surface active agent to prepare an aqueous dispersion treatment agent, the aqueous dispersion treatment agent that effectively acts to cellulose and that contains a polymer dispersant is obtained by such an extremely simple process that a surface active agent is used and added according to a particular order of addition. By adding and mixing the aqueous dispersion treatment agent into cellulose, a readily dispersible cellulose composition is provided, and the readily dispersible cellulose composition is used to prepare a composite material of the readily dispersible cellulose composition with a resin, thereby making it possible to obtain a cellulose-dispersed resin composition in an extremely easy manner. According to studies conducted by the present inventors, cellulose is dispersed favorably in the resin in the obtained cellulose-dispersed resin composition, and further, when the cellulose-dispersed resin composition is injection-molded, the mechanical strength is improved. In this way, a readily dispersible cellulose composition that is excellent in compatibility with resins is obtained by an extremely simple process without using a large amount of organic solvents, and therefore widespread utilization of cellulose that is excellent as a functional material can be expected.

Hereinafter, the aqueous dispersion treatment agent for cellulose, which contains a polymer dispersant that characterizes the present invention, will be described in detail.

The aqueous dispersion treatment agent for cellulose according to the present invention can be prepared by adding water to a hydrophilic organic solvent solution containing a polymer dispersant and a surface active agent. Particularly in the present invention, it is essential that, first of all, a polymer dispersant having a particular block copolymer structure be dissolved in a hydrophilic organic solvent solution, a surface active agent be added to the resultant solution, and thereafter water be added to the resultant mixture to prepare an aqueous dispersion treatment agent containing a polymer dispersant. Hereinafter, each material for use in preparing the aqueous dispersion treatment agent will be described.

The detailed characteristics of the preferred polymer dispersant that can be used in the present invention will be described later, however particularly in the present invention, a polymer dispersant that can be dissolved in a hydrophilic organic solvent is used. Moreover, any hydrophilic organic solvent may be used as the hydrophilic organic solvent for use in the present invention as long as the hydrophilic organic solvent is compatible with water and makes a uniform solution when mixed with water, however it is particularly preferable to use an alcohol-based solvent or a glycol-based solvent. In the preparation of the aqueous dispersion treatment agent for cellulose according to the present invention, a hydrophilic organic solvent solution containing a polymer dispersant is used, and it is preferable that the concentration of the polymer dispersant in the organic solvent in this case is 5 to 80% by mass. It is not preferable that the concentration is higher than 80% by mass because the viscosity of the polymer dispersant solution becomes excessively high to arise a risk that it becomes difficult to mix water uniformly in the case where water is added to the polymer dispersant solution. Moreover, it is not preferable that the concentration is lower than 5% by mass because the amount of the hydrophilic organic solvent becomes relatively large and the amount of the hydrophilic organic solvent in the obtained aqueous dispersion treatment agent becomes also large to give rise to a problem of removal of the organic solvent thereafter. Accordingly, it is preferable that the concentration of the polymer dispersant in the organic solvent is 5 to 80% by mass, more preferably 5 to 50% by mass, and still more preferably 10 to 30% by mass. As the hydrophilic organic solvent solution containing a polymer dispersant for use in the present invention, a polymerization solution obtained in preparing the polymer dispersant can be used as it is, and in this case, the process according to the present invention becomes a simpler process. The polymerization solution diluted with a hydrophilic organic solvent to adjust the concentration in a range as described above can also be used. It is needless to say that the polymer dispersant precipitated once from the polymerization solution is dissolved again in a hydrophilic organic solvent and the resultant solution can also be used.

As described previously, the feature of the present invention is in that an aqueous dispersion treatment agent for cellulose, which contains a polymer dispersant, is prepared by adding water to a hydrophilic organic solvent solution containing: a polymer dispersant having a particular block copolymer structure; and a surface active agent by a particular process specified in the present invention. It is preferable that the concentration of the surface active agent in the hydrophilic organic solvent solution is 0.01 to 1% by mass. It is not preferable that the concentration is higher than 1% by mass because the content of the surface active agent in the cellulose-dispersed resin composition becomes excessively large and there is a risk that the surface active agent acts as a plasticizer and has an adverse effect on the physical properties of the cellulose-dispersed resin composition. Moreover, when the concentration is lower than 0.01% by mass, the effect as a surface active agent is low and there is a risk that the aqueous dispersion treatment agent for cellulose, which characterizes the present invention and which contains a polymer dispersant, is not uniformly formed and the polymer dispersant precipitates to cause sedimentation. Furthermore, it is not preferable that the concentration is lower than 0.1% by mass because there is a risk that the polymer dispersant does not act effectively when cellulose is treated with the polymer dispersant. Accordingly, it is preferable that the concentration of the surface active agent in the hydrophilic organic solvent solution is 0.01 to 1% by mass, and more preferably 0.05 to 0.5% by mass.

The aqueous dispersion treatment agent for cellulose and for use in the present invention is obtained by adding water to a hydrophilic organic solvent solution containing a polymer dispersant and a surface active agent, and it is preferable that, in the total amount of the hydrophilic organic solvent solution, the amount of water is 50% by mass or more and the amount of the hydrophilic organic solvent is 30% by mass or less. The process according to the present invention has a characteristic in that cellulose is treated with a polymer dispersant using water as the main medium to prepare a readily dispersible cellulose composition, and therefore it is preferable that the content of water is large and the amount of the hydrophilic organic solvent is small in the aqueous dispersion treatment agent for cellulose according to the present invention. As described above, it is particularly preferable in the present invention that, in the aqueous dispersion treatment agent for cellulose according to the present invention, the content of water is set to be 50% by mass or more and the content of the hydrophilic organic solvent is set to be 30% by mass or less by adjusting the amount of water added. However, the concentrations are not limited to these ranges.

(Polymer Dispersant)

Hereinafter, the polymer dispersant that can suitably be used in the present invention will be described in detail.

As the polymer dispersant for use in the present invention, a polymer dispersant having a block copolymer structure having a resin-affinitive segment A and a cellulose-adsorptive segment B is used, and further, it is preferable that the polymer dispersant for use in the present invention is a block copolymer satisfying all of the following requirements (1) to (5).

(1) 90% by mass or more of constituents of the A-B block copolymer is constituted by a methacrylate-based monomer or methacrylate-based monomers;

(2) 50% by mass or more of constituents of the cellulose-adsorptive segment B is constituted by a methacrylate-based monomer having one or more hydroxy groups and/or a methacrylate-based monomer having a urea group, and the cellulose-adsorptive segment B does not have compatibility with resins;

(3) the resin-affinitive segment A has a number average molecular weight of 500 to 20000 in terms of polystyrene in gel permeation chromatography, and a ratio of the resin-affinitive segment A in the whole A-B block copolymer is 5 to 95% by mass;

(4) the cellulose-adsorptive segment B has a number average molecular weight of 500 to 20000 in terms of polystyrene in gel permeation chromatography, and a ratio of the cellulose-adsorptive segment B in the whole A-B block copolymer is 5 to 95% by mass; and (5) the A-B block copolymer has a number average molecular weight of 1000 to 40000 in terms of polystyrene in gel permeation chromatography and a molecular weight distribution index (weight average molecular weight/number average molecular weight) of 1.0 to 1.6.

Hereinafter, each of the requirements listed above will be described. First of all, the polymer dispersant for use in the present invention has a block copolymer structure having a resin-affinitive segment A and a cellulose-adsorptive segment B. The block copolymer has a structure in which polymer segments each formed by each monomer component of two kinds or more of monomer components each having different characteristics bond through a covalent bond and two kinds or more of the polymer segments each having different characteristics are included in one polymer chain. To take an A-B type block copolymer consisting of two kinds of segments as an example, the A-B type block copolymer has a structure in which a polymer segment A and a polymer segment B each having a different characteristic (functionality) are covalently bonded. The block copolymer has, in a polymer chain, portions in which two kinds or more of monomer components each having a different characteristic are localized for every monomer component and therefore can be expected to exhibit performance of respective components more when compared with a random copolymer in which respective monomer components are randomly arranged. That is to say, by designing the structure of the dispersant so as to have an A-B block copolymer structure having a resin-affinitive segment A and a cellulose-adsorptive segment B, the affinity to resins and the adsorptivity to cellulose can be expected to be fully exhibited by respective polymer chains. In the present invention, the structure of the polymer dispersant to be used is designed so as to have an A-B block copolymer structure having a resin-affinitive segment A and a cellulose-adsorptive segment B from the reason as described previously.

The present inventors consider as follows the reason that remarkable effects of the present invention are obtained according to the present invention. That is to say, when cellulose is treated, using the polymer dispersant having a block copolymer structure, with the aqueous dispersion treatment for cellulose, which contains the polymer dispersant and which is obtained in the manner as described previously, the surface of cellulose is effectively coated with the dispersant by multi-point interaction with the cellulose-adsorptive segment B contained in the polymer dispersant at the surface of cellulose. Moreover, the surface of cellulose is made to be hydrophobic by the resin-affinitive segment A in the polymer dispersant of the above-described structure, therefore the affinity between cellulose and the resin can be improved, and cellulose turns into a cellulose composition that exhibits a readily-dispersible property to resins. Furthermore, the resin composition obtained by preparing a composite material with the resin using the cellulose composition is excellent in dispersibility of cellulose by the effect of the polymer dispersant, moreover, it is considered that cellulose is coated with the polymer dispersant to enhance the strength of an interface between cellulose and the resin, and as a result, a resin composition that is excellent in strength and elastic modulus can be obtained.

In the polymer dispersant that can be used in the present invention, it is preferable that, as described in the requirement (1), 90% by mass or more of the constituents is constituted by a methacrylate-based monomer or methacrylate-based monomers. This comes from the reason as follows. In order to obtain a polymer dispersant that is more excellent in functionalities, not only the dispersant constituted by 90% by mass or more of a methacrylate-based monomer or methacrylate-based monomers is preferable in terms of the structure as a dispersant but also it is preferable that a reversible chain transfer catalyzed polymerization (RTCP) method is used for the synthesis of the dispersant, as will be described later in detail, and the RTCP method can exhibit an excellent living polymerizability, gives favorable polymerization yields, makes the molecular weight distribution narrow, and makes preparation of block copolymers easy when methacrylic-based monomers are mainly used. More specifically, when acrylic-based monomers, styrene-based monomers, or vinyl-based monomers are present, the molecular weight distribution may become broad or polymerization yields may be lowered, and therefore, in the polymer dispersant for use in the present invention, it is preferable that 90% by mass or more of the constituents is constituted by a methacrylic-based monomer or methacrylic-based monomers. By designing the polymer dispersant for use in the present invention so that 90% by mass of the constituents may be constituted by a methacrylic-based monomer or methacrylic-based monomers, a block copolymer becomes a polymer dispersant in which differences among respective block structures are more definite and becomes a dispersant more excellent in functionalities.

Moreover, in the polymer dispersant for use in the present invention, it is preferable that, as described in the requirement (2), 50% by mass or more of the cellulose-adsorptive segment B is constituted by a methacrylate-based monomer having one or more hydroxy groups and/or a methacrylate-based monomer having a urea group and the cellulose-adsorptive segment B does not have compatibility with thermoplastic resins. This comes from the reasons as follows. One reason is that, as described in the requirement (1), it is required for the polymer dispersant that 90% by mass or more of the constituents be constituted by a methacrylate-based monomer or methacrylate-based monomers. Moreover, the second reason is that when the polymer dispersant is constituted as described in the requirement (2), the polymer dispersant has a structure having a hydroxy group and/or a urea group in a segment and therefore the segment is considered to exhibit a good effect as a cellulose-adsorptive segment B in the block copolymer. The action is considered to be achieved from the reason as follows. First of all, cellulose has hydroxy groups in the skeleton thereof and is a very strong and water-insoluble polymer because of the action of hydrogen bonds between hydroxy groups thereof. It is considered that such hydroxy groups in cellulose and hydroxy groups and/or urea groups in the segment B that constitutes the polymer dispersant according to the present invention bond together through hydrogen bonds and, as a result, the dispersant functions so as to be adsorbed to cellulose. According to studies conducted by the present inventors, it is preferable that the ratio of the hydroxy group component and/or the urea group is 60% by mass or more, and more preferably 70% by mass or more in the constituents of the cellulose-adsorptive segment B. On the other hand, it is not preferable that the ratio of the methacrylate-based monomer having one or more hydroxy groups and/or the methacrylate-based monomer having a urea group that constitute the segment B is less than 50% by mass because the effect as the cellulose-adsorptive segment B is insufficient and the effect as the dispersant may not be exhibited sufficiently.

In the polymer dispersant for use in the present invention, it is preferable that, as described in the requirement (3), the resin-affinitive segment A has a number average molecular weight of 500 to 20000 in terms of polystyrene in gel permeation chromatography. Furthermore, it is more preferable that the number average molecular weight is about 1000 to about 8000 in order to exhibit resin affinity to resins (compatibility with resins). The range is in a molecular weight region where the efficiency of exhibiting the affinity to resin of the resin-affinitive segment A is considered to be the highest. Furthermore, it is preferable that the ratio of the resin-affinitive segment A in the whole dispersant is 5 to 95% by mass, and more preferably 30 to 70% by mass. It is not preferable that the ratio is less than 5% by mass because the amount of the resin-affinitive component is relatively small and the affinity to resins may not be exhibited sufficiently. On the other hand, it is not preferable that the ratio is larger than 95% by mass because the amount of the cellulose-adsorptive component is relatively small and the adsorptivity to cellulose may not be exhibited sufficiently.

In the polymer dispersant for use in the present invention, it is preferable that, as described in the requirement (4), the cellulose-adsorptive segment B has a number average molecular weight of 500 to 20000 in terms of polystyrene in gel permeation chromatography. Furthermore, it is more preferable that the number average molecular weight is about 1000 to about 8000 in order to exhibit a high adsorptivity to cellulose. The range is in a molecular weight region where the efficiency of exhibiting adsorption to cellulose of the cellulose-adsorptive segment B is considered to be the highest. Furthermore, it is preferable that the ratio of the cellulose-adsorptive segment B in the whole dispersant is 5 to 95% by mass. The ratio is more preferably 30 to 70% by mass. When the ratio is less than 5% by mass, the amount of the cellulose-adsorptive component is relatively small, and therefore cellulose adsorptivity cannot be exhibited sufficiently. On the other hand, when the ratio is larger than 95% by mass, the amount of the resin-affinitive component is relatively small, and therefore the affinity to resins cannot be exhibited sufficiently.

It is preferable, as described in the requirement (5), the polymer dispersant for use in the present invention has a number average molecular weight of 1000 to 40000 in terms of polystyrene in gel permeation chromatography. Furthermore, it is more preferable that the number average molecular weight is about 2000 to about 16000. It is not preferable that the molecular weight becomes large because there is a possibility that the aqueous dispersion of the polymer dispersant is not stably formed and there is a risk that cellulose cannot effectively be treated with the polymer dispersant. Moreover, it is preferable that the molecular weight distribution index (weight average molecular weight/number average molecular weight) is 1.0 to 1.6. Furthermore, it is more preferable that the molecular weight distribution index is 1.0 to 1.5. The molecular weight distribution index of the polymer dispersant shows an extent of the molecular weight distribution, and a small molecular weight distribution index value means that the distribution of the molecular weight of the polymer dispersant is narrow, namely that the uniformity of the molecular weight is high. Narrow molecular weight distribution means that both the amount of polymer dispersants having a large molecular weight and the amount of polymer dispersants having a small molecular weight are small and the characteristics of the polymer dispersants become uniform, and can make the effect of imparting a fine dispersion state of high level to cellulose brought about by the polymer dispersant more improved.

<Resin-Affinitive Segment A>

The resin-affinitive segment A that constitutes the preferred polymer dispersant for use in the present invention is for making the surface of cellulose hydrophobic through the cellulose-adsorptive segment B. As one of the basics of the affinity to resins, it is preferable that the resin-affinitive segment A has a structure similar to that of a resin as an object or has hydrophobicity similar to that of a resin as an object to which the resin-affinitive segment A has affinity, and moreover, the constituent of the resin-affinitive segment A is a methacrylate-based monomer from the requirement (1) for the polymer dispersant that is suitably be used in the present invention. Examples of the monomer component of the resin-affinitive segment A for use in the present invention include alkyl-, alkenyl-, cycloalkyl-, aromatic ring-, and halogen-containing methacrylates such as methyl methacrylate, ethyl methacrylate, n-propyl methacrylate, isopropyl methacrylate, t-butyl methacrylate, hexyl methacrylate, 2-ethylhexyl methacrylate, lauryl methacrylate, tetradecyl methacrylate, octadecyl methacrylate, cyclohexyl methacrylate, bornyl methacrylate, isobornyl methacrylate, dicyclopentanyl methacrylate, dicyclopentenyloxyethyl methacrylate, benzyl methacrylate, tetrahydrofurfuryl methacrylate, octafluorooctyl methacrylate, and tetrafluoroethyl methacrylate.

<Cellulose-Adsorptive Segment B>

According to studies conducted by the present inventors, the cellulose-adsorptive segment B that constitutes the polymer dispersant for use in the present invention shows the interaction to hydroxy groups present on the surface of cellulose through hydrogen bonds. As described in the requirement (2), in the preferred cellulose-adsorptive segment B for the present invention, 50% by mass or more of the constituents of the cellulose-adsorptive segment B is constituted by a methacrylate-based monomer having one or more hydroxy groups and/or a methacrylate-based monomer having a urea group. By constituting the cellulose-adsorptive segment B as such, hydrogen bonds are formed between hydroxy groups present on the surface of cellulose and the cellulose-adsorptive segment B and multi-point interaction is exhibited in the polymer chain, allowing the cellulose-adsorptive segment B to be effectively adsorbed to cellulose. That is to say, the cellulose-adsorptive segment B is effectively adsorbed to cellulose, and as a result, cellulose is made to be hydrophobic due to the effect of the resin-affinitive segment A in the structure of the polymer dispersant. Moreover, the cellulose-adsorptive segment B has hydroxy groups, etc. to make the polymer dispersant easy to dissolve in the hydrophilic organic solvent, and therefore is advantageous in preparing an aqueous dispersion treatment agent for cellulose, which contains a polymer dispersant and which is for use in the present invention, and furthermore the polymer dispersant does not precipitate, and therefore a stable aqueous dispersion can be obtained. It is to be noted that the cellulose-adsorptive segment B must not have compatibility with (affinity to) resins as a dispersion medium. In the present specification, the affinity means that two substances can be mixed with each other and exhibit compatibility to each other. It is not preferable that a resin and the segment B have affinity to each other because the segment B adsorbed to cellulose is also affinitive to the resin and may be desorbed from cellulose and thus a favorable dispersion state may not be exhibited.

From the requirement (1), it is preferable that the constituent of the cellulose-adsorptive segment B that constitutes the polymer dispersant for use in the present invention is a methacrylate-based monomer. Therefore, specific examples of the methacrylate-based monomer that is for use in the present invention and that has one or more hydroxy groups include hydroxy group-containing methacrylates such as 2-hydroxyethyl methacrylate, 2-hydroxypropyl methacrylate, 3-hydroxypropyl methacrylate, 2-hydroxybutyl methacrylate, 3-hydroxybutyl methacrylate, 4-hydroxybutyl methacrylate, polyethylene glycol monomethacrylates, polypropylene glycol monomethacrylates, and glyceryl monomethacrylate.

Examples of the methacrylate-based monomer that is for forming the cellulose-adsorptive segment B and that has a urea group include methacryloyloxyethyl urea and methacryloyloxyethyl ethylene urea.

Moreover, as a monomer that constitutes the cellulose-adsorptive segment B and that is other than the above-described methacrylate-based monomers, the alkyl-, alkenyl-, cycloalkyl-, aromatic ring-, or halogen-containing methacrylates can be used, and furthermore, alkoxy group- or glycidyl group-containing methacrylate-based monomers can be used in a range of use as described previously. Specific examples of such monomers include methoxyethyl methacrylate, ethoxyethyl methacrylate, methoxypropyl methacrylate, methoxy polyethylene glycol monoethyl ether methacrylates, ethoxy polyethylene glycol monoethyl ether methacrylates, glycidyl methacrylate, 3,4-epoxycyclohexyl methacrylate, methacryloyloxyethyl glycidyl ether, methacryloyloxyethoxyethyl glycidyl ether, and amino group-containing methacrylates and quaternary ammonium type methacrylates thereof such as diethylaminoethyl methacrylate and t-butylaminoethyl methacrylate. It is to be noted herein that any of the expressions "poly" and "(poly)" above means n=2 or more. Among the monomers, 2-hydroxyethyl methacrylate (HEMA), glyceryl monomethacrylate, and methacryloyloxyethyl ethylene urea are preferable because they are general purpose monomers, have a small molecular weight per one hydroxy group or one urea group and can make the number of functional groups large resulting in enhancement of the effects, and have poor compatibility with resins.

Hereinafter, a still more preferable constitution of the cellulose-adsorptive segment B that constitutes the preferred polymer dispersant for use in the present invention will be described. As a more preferred embodiment, there is a case where it is preferable to conduct emulsification making the amount of a surface active agent as small as possible, and in such a case, when the cellulose-adsorptive segment B is formed, 3 to 15% by mass of the monomer components for forming the cellulose-adsorptive segment B is constituted by a methacrylic acid neutralized with an alkali and/or a methacrylate-based monomer having a carboxy group neutralized with an alkali, or by a methacrylate-based monomer having a quaternary ammonium salt. These monomers are ionized monomers. The reason is as follows. When a monomer that is affinitive to water, such as the neutralized carboxy group or the quaternary ammonium salt, is present as a constituent of the cellulose-adsorptive segment B, the cellulose-adsorptive segment B can suitably be used in an aqueous dispersion treatment agent by the effect of enhancing the adsorptivity of the cellulose-adsorptive segment B to cellulose, and, in addition to this effect, by constituting the cellulose-adsorptive segment B as such. That is to say, by introducing a functional group such as a carboxy group or a quaternary ammonium group in the structure of the cellulose-adsorptive segment B, the segment B dissolves in water, and therefore the polymer dispersant that is for use in the present invention and that has the A-B block copolymer structure can be made so as to be self-emulsifying, and by this constitution, there is an effect of assisting an emulsifying property of a surface active agent. As a result, an aqueous dispersion treatment agent can readily be prepared.

Examples of the methacrylic acid and/or the methacrylate-based monomer having a carboxy group, and the methacrylate-based monomer having a quaternary ammonium salt, which are used for forming the cellulose-adsorptive segment B, include the following monomers. Specific examples of the monomers include methacrylic acid, methacrylates having a carboxy group and being obtained by reacting a polybasic acid such as phthalic acid with a methacrylate-based monomer having a hydroxy group, such as 2-hydroxyethyl methacrylate, and quaternary ammonium salt-containing methacrylate-based monomers obtained by quaternizing dimethylaminoethyl methacrylate, diethylaminoethyl methacrylate, or the like with methyl chloride, benzyl chloride, or dimethyl sulfate. Methacrylic acid and quaternary ammonium salts obtained from dimethylaminoethyl methacrylate and methyl chloride or benzyl chloride in which there is no possibility of hydrolysis are preferable because of their high versatility. Moreover, neutralization is conducted with an alkali, however the alkali is not particularly limited. Examples of the alkali include: ammonia; organic amines such as dimethylaminoethanol; and hydroxides such as sodium hydroxide and potassium hydroxide.

Moreover, the amount of the ionized methacrylate introduced in the cellulose-adsorptive segment B is 3 to 15% by mass in the segment B. When the amount introduced is less than 3% by mass, the self-emulsifying property is deficient and a surface active agent is needed as will be described later, and when the amount introduced is more than 15% by mass, there is a possibility that water resistance is lowered. The amount introduced is more preferably 5 to 13% by mass. Furthermore, the ionized methacrylate must not be introduced in the resin-affinitive segment. The compatibility with resins is poor due to ionization, and therefore there is a possibility that the dispersion of cellulose is inhibited.

<Process for Producing Polymer Dispersant>

Next, a method for synthesizing the preferred polymer dispersant for the present invention, the polymer dispersant satisfying all of the requirements (1) to (5), will be described. It is preferable that the polymer dispersant for use in the present invention is the A-B type block copolymer having a block copolymer structure having a resin-affinitive segment A and a cellulose-adsorptive segment B, and it is preferable to use a living radical polymerization method in synthesizing the A-B type block copolymer. Living radical polymerization is a method by which a polymer having a definite molecular structure can be obtained in radical polymerization. Terminal radicals of growing chains are stabilized during polymerization, and therefore addition of additional monomer to a reaction system subsequently to polymerization of a certain monomer allows polymerization to progress again, thereby making it possible to synthesize a block copolymer having a plurality of polymer segments each having a different composition.

Examples of the living radical polymerization method include a Nitroxide mediated polymerization method (hereinafter abbreviated as NMP method) using a nitroxide, an atom transfer radical polymerization method (Atom Transfer Radical Polymerization method, hereinafter abbreviated as ATRP method) that is a method in which a protective group being a halogen atom is abstracted by a metal complex, a reversible addition fragmentation transfer polymerization method (Reversible Addition Fragmentation Transfer Polymerization method, hereinafter abbreviated as RAFT method) using a dithioester or xanthate compound, a method using an organotellurium compound, an organobismuth compound, or other compounds, a method using a cobalt complex, an iodine transfer polymerization method, and a reversible transfer catalyzed polymerization (Reversible Transfer Catalyzed Polymerization method, hereinafter abbreviated as RTCP method) using iodine as a protective group and using a phosphorus compound, a nitrogen compound, an oxygen compound, or a hydrocarbon compound as a catalyst, and any of these methods can be used.

However, the NMP method is not preferable because sufficient structure control cannot be conducted for methacrylic-based monomers although the NMP method can be used for polymerizing acrylic-based monomers and styrene-based monomers, etc. The reason is that polymerization is accompanied by a side reaction of tertiary radicals due to dissociation of terminals. Moreover, high temperatures are generally required for the NMP method, further, the nitroxide compound for use in the NMP method is a special compound and is high in cost, and safety is not secured from an environmental point of view. Furthermore, an amine-based complex is used in the ATRP method, and therefore a carboxy group-containing monomer cannot be used as it is. In the RAFT method, it is difficult to achieve a low molecular weight distribution when various kinds of monomers are used, and there are drawbacks such as odor of sulfur and coloration. The method using an organotellurium is not preferable in that organic metals are expensive and safety tests for the organic metals are costly because the environmental safety thereof is unknown.

From the reasons as described above, the RTCP method being a polymerization method that can be conducted by using both a polymerization initiation compound and a catalyst in conventional radical polymerization is suitable as the living radical polymerization method for use in synthesizing the preferred polymer dispersant for the present invention.

The above-described polymerization progresses by the reaction mechanism represented by the reaction formula 1 given below, namely, polymerization progresses by a reversible activation reaction of a dormant species, Polymer-X (P-X), into a propagating radical.

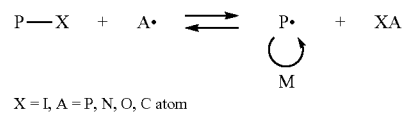

(Reaction Formula 1)

$$P-X + A\cdot \rightleftharpoons P\cdot + XA$$

$$X = I, A = P, N, O, C \text{ atom}$$

There is a possibility that the polymerization reaction mechanism changes depending on the kind of catalyst, however the polymerization reaction is considered to progress as follows. In the reaction formula 1, P. generated from a radical initiator reacts with XA to produce a catalyst A· in situ. A· acts as an activation agent of P-X, and by this catalytic action, P-X is activated with high frequency.

To describe in more detail, when an organic iodine compound is used as a polymerization initiation compound, an organic radical generated by heat or light reacts with a monomer to generate a radical at a polymer terminal. On the other hand, iodine radicals sequentially generated bond to the radicals at polymer terminals and are stabilized, and therefore the occurrence of stopping reaction can be prevented. The living radical polymerization progresses by repeating such process, and therefore the molecular weight and structure of the A-B block copolymer to be obtained can easily be controlled as desired.

The organic iodine compound is not particularly limited as long as the organic iodine compound can generate an iodine radical by the action of light or heat. Specific examples of the organic iodine compound include: alkyl iodides such as 2-iodo-1-phenylethane and 1-iodo-1-phenylethane; and cyano group-containing iodides such as 2-cyano-2-iodopropane, 2-cyano-2-iodobutane, 1-cyano-1-iodocyclohexane, and 2-cyano-2-iodovaleronitrile.

In this case, commercially available organic iodine compounds may be used as they are or organic iodine compounds synthesized by a conventionally known method may be used. The organic iodine compound can be obtained, for example, by reacting an azo compound such as azobisisobutyronitrile with iodine. Moreover, the organic iodine compound may be produced using an iodide salt such as quaternary ammonium iodide or sodium iodide together with an organic halide having a halogen atom other than iodine, such as bromine or chlorine, and causing halogen exchange reaction to occur in a reaction system.

Moreover, in the living radical polymerization, it is preferable to use a catalyst that can generate an iodine radical by abstracting an iodine atom from the iodine compound. Examples of the catalyst include: phosphorus-based compounds such as phosphorus halides, phosphite-based compounds, and phosphinate compounds; nitrogen-based compounds such as imide-based compounds; oxygen-based compounds such as phenol-based compounds; and active carbon atom-containing hydrocarbon compounds such as diphenylmethane-based compounds and cyclopentadiene-based compounds. In addition, these catalysts may be used alone or in combination of two or more.

(Hydrophilic Organic Solvent)

Next, the hydrophilic organic solvent for use in dissolving the above-described polymer dispersant and for use in the present invention will be described. The hydrophilic organic solvent for use in the present invention is not particularly limited as long as the hydrophilic organic solvent is uniformly compatible with water and dissolves the polymer dispersant, but the hydrophilic organic solvent is preferably an alcohol-based solvent or a glycol-based solvent. As the alcohol-based solvent, for example, methanol, ethanol, propanol, butanol, pentanol, and hexanol, etc. can be used, and as the glycol-based solvent, for example, ethylene glycol, propylene glycol, diethylene glycol, ethylene glycol methyl ether, propylene glycol methyl ether, propylene glycol propyl ether, diethylene glycol methyl ether, diethylene glycol butyl ether, and diethylene glycol dimethyl ether, etc. can be used. Moreover, as the hydrophilic organic solvent, amines such as methylamine, ethylamine, propylamine, butylamine, dimethylamine, diethylamine, trimethylamine, triethylamine, ethylene diamine, and diethylene triamine, and amides such as dimethylformamide, dimethylacetoamide, pyrrolidone, methyl pyrrolidone, and ethyl pyrrolidone can also be used. According to studies conducted by the present inventors, it is more preferable to use hydrophilic organic solvents having a boiling point of 170° C. or less in consideration of removal of the hydrophilic organic solvents by drying.

(Surface Active Agent)

The surface active agent for use in the present invention will be described. In the present invention, general surface active agents such as cationic surface active agents, anionic surface active agents, and nonionic surface active agents can be used as the surface active agent. According to studies conducted by the present inventors, when cationic surface active agents in particular are used among others, the aqueous dispersion treatment agent for cellulose, which contains a polymer dispersant, can be formed more stably, and by using the dispersion treatment agent, more effective treatment can be applied to cellulose.

Examples of the cationic surface active agent for use in the present invention include a carboxylic acid salt, an inorganic acid salt, and a quaternary ammonium salt of aliphatic amines. Specifically, as the carboxylic acid salt or inorganic acid salt of aliphatic amines, an acetic acid salt, a propionic acid salt, a lactic acid salt, a citric acid salt, a hydrochloric acid salt, a sulfuric acid salt, a nitric acid salt, a phosphoric acid salt of amines such as laurylamine, methyl laurylamine, dimethyl laurylamine, myristylamine, palmytylamine, stearylamine, methyl stearylamine, dimethyl stearylamine, methyl distearylamine, oleylamine, methyl oleylamine, dimethyl oleylamine, linolamine, and linoleneamine can be used. Moreover, as the quaternary ammonium salt of aliphatic amines, trimethyl lauryl ammonium chloride, dimethyl dilauryl ammonium chloride, methyl tristearyl ammonium chloride, trimethyl stearyl ammonium chloride, dimethyl distearyl ammonium chloride, methyl tristearyl ammonium chloride, trimethyl stearyl ammonium bromide, trimethyl oleyl ammonium chloride, dimethyl distearyl ammonium chloride, and methyl trioleyl ammonium chloride, etc. can be used.

The anionic surface active agent is not particularly limited, and general surface active agents can be used. Specifically, for example, alkylbenzene sulfonic acid salts such as sodium dodecylbenzene sulfonate, alkylnaphthalene sulfonic acid salts such as sodium dodecylnaphthalene sulfonate, polystyrene sulfonic acid salts such as sodium polystyrene sulfonate, and alkyl sulfates such as sodium dodecyl sulfate can be used. The nonionic surface active agent is not particularly limited, and general surface active agents can be used. Specifically, for example, polyoxyethylene alkyl ethers such as polyoxyethylene lauryl ether, polyethylene glycol fatty acid esters such as polyethylene glycol monolaurate, and glycerin fatty acid esters such as glycerol monostearate can be used.

(Cellulose)

It is preferable that cellulose for use in the present invention is at least one selected from the group consisting of a cellulose nanofiber (hereinafter, written as CNF), a cellulose nanocrystal (hereinafter, written as CNC), pulp, lignocellulose, and wood flour. Particularly, it is more preferable to use the CNF or the CNC. In the present invention, the CNF and the CNC are referred to as "nanocellulose". Hereinafter, each type of the cellulose will be described in detail.

Examples of the plant fiber used as a raw material for cellulose (or cellulose fiber) include: natural cellulose obtained from a natural plant raw material such as wood, bamboo, hemp, jute, kenaf, cotton, beet, residue waste from agricultural products, and cloth; and regenerated cellulose fibers such as pulp (paper), rayon, and cellophane. Examples of the wood include, but not limited to, Sitka spruce, cedar, hinoki cypress, blue gum, and acacia, and examples of the paper include, but not limited to, deinked waste paper, cardboard waste paper, magazines, and copying paper. The plant fibers may be used alone or two or more plant fibers selected from these plant fibers may be used.

Lignocellulose is a main component of the plant fiber, is mainly constituted from cellulose, hemicellulose, and lignin, and has a structure in which cellulose, hemicellulose, and lignin are combined to one another, thereby forming the plant fiber. The plant fiber that contains lignocellulose is subjected to mechanical treatment or chemical treatment to remove hemicellulose and lignin and increase the purity of cellulose, and thus pulp is obtained. Bleaching treatment is conducted as necessary, and the amount of lignin in the pulp can be adjusted by adjusting the amount of delignification. Preferable examples of pulp include: chemical pulp [kraft pulp (KP), sulfite pulp (SP)], semichemical pulp (SCP), chemiground pulp (CGP), chemimechanical pulp (CMP), groundwood pulp (GP), refiner mechanical pulp (RMP), thermomechanical pulp (TMP), and chemi-thermo mechanical pulp (CTMP) obtained by subjecting a plant fiber to mechanical treatment or chemical treatment to conduct pulping; and deinked waste paper pulp, cardboard waste paper pulp, magazine waste paper pulp using the above-described pulp as a main component. Among these pulps, various kraft pulps derived from softwood with high fiber strength [softwood unbleached kraft pulp (NUKP), oxygen-prebleached softwood kraft pulp (NOKP), and softwood bleached kraft pulp (NBKP)] are particularly preferably. The lignin content in pulp is not particularly limited, but is normally about 0 to about 40% by mass and preferably about 0 to about 10% by mass. The lignin content can be measured by a Klason method.

The nanocellulose that can suitably be used in the present invention refers to cellulose obtained using a cellulose fiber-containing material (such as, for example, wood pulp)

and disaggregating the fiber of the cellulose fiber-containing material to a nano-size level (subjecting the fiber to defibration treatment), and includes the CNF and the CNC. A cellulose microfibril (single cellulose nanofiber) having a width of about 4 nm is present as a minimum unit in the cell walls of a plant fiber and is a substance having a basic skeleton of plants, and the nanocellulose is nano-sized cellulose formed by a cellulose microfibril or by a plurality of cellulose microfibril being aggregated.

In nanocellulose, the CNF is a fiber obtained by subjecting a cellulose fiber to treatment such as mechanical treatment, the fiber having a fiber width of about 4 to about 200 nm and a fiber length of about 5 μm or more. The specific surface area of the CNF is preferably about 70 to about 300 $m^2/g$, more preferably about 70 to about 250 $m^2/g$, and still more preferably about 100 to about 200 $m^2/g$. In the case where a composition is prepared in combination of the CNF and a resin, by making the specific surface area of the CNF large, the contact area can be made large and the strength is improved. Moreover, when the specific surface area is extremely large, aggregation of the resin composition in the resin is liable to occur and a high-strength material as intended may not be obtained. The average value of the fiber diameter of the CNF is normally about 4 to about 200 nm, preferably about 4 to about 150 nm, and particularly preferably about 4 to about 100 nm.

Examples of a method for defibrating the plant fiber to prepare the CNF include a method of defibrating a cellulose fiber-containing material such as pulp. AS the defibration method, for example, a method in which an aqueous suspension liquid or a slurry of the cellulose fiber-containing material is mechanically ground or beaten with a refiner, a high-pressure homogenizer, a grinder, a single-screw or multi-screw kneader (preferably, twin-screw kneader), a bead mill, or the like can be used. Treatment may be conducted in combination of the above-described defibration methods as necessary. As the defibration treatment method, for example, a defibration method described in Japanese Patent Laid-Open No. 2011-213754 or Japanese Patent Laid-Open No. 2011-195738 can be used.

Moreover, the CNC is a crystal obtained by subjecting a cellulose fiber to chemical treatment such as acid hydrolysis, and is a crystal having a crystal width of about 4 to about 70 nm and a crystal length of about 25 to about 3000 nm. The specific surface area of the CNC is preferably about 90 to about 900 $m^2/g$, more preferably about 100 to about 500 $m^2/g$, and still more preferably about 100 to about 300 $m^2/g$. In the case where a composition is prepared in combination of the CNC and a resin, by making the specific surface area of the CNC large, the contact area can be made large and the strength is improved. Moreover, when the specific surface area is extremely large, aggregation of the resin composition in the resin is liable to occur and a high-strength material as intended may not be obtained. The average value of the crystal widths of the CNC is normally about 10 to about 50 nm, preferably about 10 to about 30 nm, and particularly preferably about 10 to about 20 nm. The average value of the crystal lengths of the CNC is normally about 500 nm, preferably about 100 to about 500 nm, and particularly preferably about 100 to about 200 nm.

As a method for defibrating the plant fiber to prepare the CNC, publicly known methods can be adopted. For example, a chemical method such as a method in which an aqueous suspension liquid or a slurry of the cellulose-containing material is subjected to acid hydrolysis with sulfuric acid, hydrochloric acid, hydrobromic acid, or other acids can be used. Treatment may be conducted in combination of the above-described defibration methods as necessary.

The average value of the fiber diameters (the same applies to average fiber diameter, average fiber length, average crystal width, and average crystal length) of nanocellulose in the present invention is an average value that is taken when the fiber diameters of at least 50 fibers of the nanocellulose in a visual field of an electron microscope are measured.

Nanocellulose has a high specific surface area (preferably about 200 to about 300 $m^2/g$), has a lighter weight and a higher strength when compared with steel. Moreover, nanocellulose has a smaller thermal deformation (lower thermal expansion) when compared with glass.

Nanocellulose having a cellulose type-I crystalline structure and having a high crystallinity, as high as 50% or more, is preferable. The cellulose type-I crystallinity of nanocellulose is more preferably 55% or more and still more preferably 60% or more. The upper limit of the cellulose type-I crystallinity of nanocellulose is generally about 95% or about 90%.

The cellulose type-I crystalline structure refers to, for example, the crystal structure as described in pages 81 to 86 or pages 93 to 96 in "Encyclopedia of Cellulose, ("Serurosu no Jiten" in Japanese)", the first copy of publication in a new format or binding, published by Asakura Publishing Co., Ltd., and most of natural cellulose has a cellulose type-I crystalline structure. On the other hand, a cellulose fiber not having a cellulose type-I crystalline structure and having, for example, a cellulose type-II, III, or IV structure is derived from cellulose having a cellulose type-I crystalline structure. Among the crystalline structures, the type-I crystalline structure has a higher crystalline elastic modulus when compared with other structures.

As the cellulose for use in the present invention, nanocellulose having a type-I crystalline structure is preferable among the above-described types of nanocellulose. When cellulose is a type-I crystal, a composite material having a low linear expansion coefficient and a high elastic modulus can be obtained when the composite material is prepared from nanocellulose and a matrix resin. Nanocellulose having a type-I crystalline structure can be identified from the fact that the nanocellulose has typical peaks at two positions around $2\theta=14°$ to 17° and around $2\theta=22°$ to 23° in a diffraction profile obtained by measuring wide angle X-ray diffraction.

For example, ethanol is added to a slurry of nanocellulose to adjust the concentration of nanocellulose to be 0.5% by mass. Subsequently, the slurry is stirred with a stirrer, and filtration under reduced pressure (using 5C filter paper manufactured by Advantec Toyo Kaisha, Ltd.) is started immediately after stirring. Subsequently, the wet web thus obtained is subjected to thermocompression with a pressure of 0.1 t at 110° C. for 10 minutes to obtain a 50 $g/m^2$ CNF sheet. The crystallinity of cellulose type-I nanocellulose is determined by measuring the CNF sheet with an X-ray generation apparatus ("UltraX18HF" manufactured by Rigaku Corporation) under the measurement condition that a target Cu/Kα ray is used with a voltage of 40 kV, an electric current of 300 mA, a scanning angle ($2\theta$) from 5.0° to 40.0°, and a step angle of 0.02°.

The degree of polymerization of cellulose is about 500 to about 10000 for natural cellulose and is about 200 to about 800 for regenerated cellulose. In cellulose, some cellulose fibers each linearly extended by β-1,4 bonds form a bundle, and in the bundle, the cellulose fibers are fixed by intramolecular or intermolecular hydrogen bonds to form a crystal in which cellulose is in a state of an extended chain. It has been made clear that a lot of crystal forms exist in cellulose crystals by X-ray diffraction analysis or solid NMR analysis, however the crystal form of natural cellulose is only type-I. From X-ray diffraction or other analytical methods, it is inferred that the ratio of a crystal region in cellulose is about 50 to about 60% for wood pulp and, for bacterial cellulose, the ratio is higher than that for wood pulp and is about 70%. Cellulose not only has a high elastic modulus but also exhibits strength that is 5 times stronger than that of steel and linear expansion coefficient that is 1/50 lower than that of glass, which is caused by the fact that cellulose has an extended chain crystal. Conversely, breaking the crystal structure of cellulose leads to losing excellent characteristics of cellulose, such as a high elastic modulus and a high strength.

The aqueous dispersion treatment agent for cellulose, which contains the polymer dispersant and which characterizes the present invention, is used to treat cellulose therewith, a readily dispersible cellulose composition in which cellulose is favorably dispersed by the polymer dispersant can be obtained without breaking the cellulose crystal. Moreover, the readily dispersible cellulose composition is used to prepare a composite material with resin, thereby making it possible to obtain a cellulose-dispersed resin composition in which cellulose is favorably dispersed in the resin without breaking the cellulose crystal. When cellulose exists in a state where the cellulose crystal is not broken in the resin, and moreover, when the cellulose has an excellent dispersibility, excellent mechanical properties of cellulose, such as a high elastic modulus and a high strength, are exhibited in the resin, thereby making it possible to obtain a resin composition having a high elastic modulus and a high strength.

For obtaining the cellulose-dispersed resin composition in the present invention, the aqueous dispersion treatment agent for cellulose, which contains a polymer dispersant, is added to cellulose to prepare a readily dispersible cellulose composition, and the readily dispersible cellulose composition is used to prepare a composite material with a resin. In the present invention, it is preferable that cellulose for use in this case is in a water-containing state. That is to say, by using cellulose in a water-containing state, treatment using water as the main component can be conducted in treatment of cellulose with the aqueous dispersion treatment agent for cellulose, which contains a polymer dispersant, and therefore the treatment is economical. On the other hand, when cellulose is once dried, addition of the aqueous dispersion treatment agent for cellulose, which contains a polymer dispersant, to the cellulose becomes so difficult that mechanical treatment or defibration treatment has to be conducted again. The cellulose in a water-containing state may contain a hydrophilic solvent such as an alcohol, a glycol, an amine, or an amide in addition to water. As the alcohol, methanol, ethanol, propanol, and butanol, etc. may be contained, as the glycol, ethylene glycol, propylene glycol, diethylene glycol, ethylene glycol methyl ether, propylene glycol methyl ether, propylene glycol propyl ether, diethylene glycol methyl ether, diethylene glycol butyl ether, and diethylene glycol dimethyl ether, etc. may be contained, as the amine, methylamine, ethylamine, propylamine, butylamine, dimethylamine, diethylamine, trimethylamine, triethylamine, ethylenediamine, and diethylenetriamine, etc. may be contained, and as the amide, dimethylformamide, dimethylacetamide, pyrrolidone, methyl pyrrolidone, and ethyl pyrrolidone, etc. may be contained.

In the present invention, at least one cellulose fiber in a water-containing state or in a dry state selected from the group consisting of the above-described CNF, CNC, pulp, lignocellulose, and wood flour can be used, however since nanocellulose potentially has a high elastic modulus and a high strength, it is preferable to use nanocellulose. By using nanocellulose, the cellulose-dispersed resin composition obtained by preparing a composite material with resin is excellent in mechanical strength.

(Production of Aqueous Dispersion Treatment Agent for Cellulose Containing Polymer Dispersant)

The aqueous dispersion treatment agent for cellulose, which contains a polymer dispersant and which is for use in the present invention, is prepared by adding water to a hydrophilic organic solvent solution containing a polymer dispersant and a cationic surface active agent. A particularly important thing is that, first of all, the polymer dispersant is dissolved in a hydrophilic organic solvent solution, then a surface active agent is added to the resultant solution, and thereafter adding water to the resultant mixture to prepare an aqueous dispersion treatment agent containing the polymer dispersant. According to studies conducted by the present inventors, in order to make it possible to treat cellulose effectively with the polymer dispersant, it is required that the aqueous dispersion treatment agent be prepared satisfying the order of addition as described above. That is to say, even though the aqueous dispersion treatment agent contains a polymer dispersant, a surface active agent, a hydrophilic organic solvent, and water, the remarkable effects according to the present invention cannot be obtained unless the aqueous dispersion treatment agent is prepared through the order of addition as specified in the present invention. In other words, if the dispersion of cellulose is realized using an aqueous dispersion treatment agent containing a polymer dispersant, a surface active agent, a hydrophilic organic solvent, and water, it can be said that the embodiment has carried out the process as specified in the present invention.

As the hydrophilic organic solvent solution containing a polymer dispersant for producing the aqueous dispersion treatment agent for cellulose, a polymerization solution containing the polymer dispersant may be used as it is or the polymerization solution diluted with the hydrophilic organic solvent may be used. Furthermore, the polymerization solvent is removed from the polymerization solution by precipitation or drying to prepare a polymer dispersant single substance, and a solution obtained by diluting the polymer dispersant single substance again with a hydrophilic organic solvent may be used. With respect to the method for adding water to a hydrophilic organic solvent solution containing a polymer dispersant and a surface active agent, a method in which water is dropped into the hydrophilic organic solvent solution containing a polymer dispersant and a surface active agent under stirring is preferable, but is not particularly limited.

As the polymer dispersant for use in producing the aqueous dispersion treatment agent, the above-described polymer dispersant having a block copolymer structure having a resin-affinitive segment A and a cellulose-adsorptive segment B is used, and in this case, use of the above-described polymer dispersant in which an ionic methacrylate is introduced to the cellulose-adsorptive segment to make the polymer dispersant self-emulsifying becomes effective means of making it possible to reduce the amount of a surface active agent and prepare an aqueous dispersion treatment agent more easily.

(Treatment of Cellulose with Aqueous Dispersion Treatment Agent for Cellulose Containing Polymer Dispersant)

As the process for treating cellulose with the aqueous dispersion treatment agent for cellulose, which contains a polymer dispersant and which is for use in the present invention, a process in which an aqueous dispersion treatment agent containing a polymer dispersant is added to cellulose that is in a water-containing state and that has a solid content of about 25% may be used. In order to treat cellulose uniformly, it is preferable that the aqueous dispersion treatment agent containing a polymer dispersant is added to cellulose under stirring to mix the cellulose and the polymer dispersant. Moreover, the conditions such as temperature and pressure during addition and polymerization are not particularly limited, and the addition and polymerization may be conducted under the condition of ordinary temperature and normal pressure, or may be conducted under the condition such as a temperature increasing condition, a cooling condition, a pressurization condition, or a reduced pressure condition. Furthermore, the stirring speed is not particularly limited. The cellulose in a water-containing state or in a dry state can be used, however it is preferable to use the cellulose in a water-containing state as described above because of easiness of treatment during addition of the dispersion treatment agent. Moreover, the cellulose in a water-containing state may contain an organic solvent other than water within a range that does not cause the cellulose to form an aggregated state.

(Resin)

In the present invention, a favorable cellulose-dispersed resin composition can be obtained through melt-kneading of a resin and the easily dispersible cellulose composition containing a polymer dispersant obtained by the present invention. The resin used in preparing the cellulose-dispersed resin composition is not particularly limited, however a thermoplastic resin is preferably used because it is preferable to obtain the cellulose-dispersed resin composition through melt-kneading. Examples of the thermoplastic resin include olefin-based resins, nylon resins, polyamide-based resins, polycarbonate-based resins, polysulfone-based resins, polyester-based resins, and cellulose-based resins such as triacetylated cellulose and diacetylated cellulose. Examples of the polyamide-based resin include polyamide 6 (PA6, ring-opening polymerization product of ε-caprolactam), polyamide 66 (PA66, polyhexamethyleneadipamide), polyamide 11 (PA11, polyamide obtained through ring-opening polycondensation of undecane lactam), and polyamide 12 (PA12, polyamide obtained through ring-opening polycondensation of lauryl lactam). Among the above-described thermoplastic resins, the olefin-based resins are preferable because the olefin-based resins have advantages that the stiffening effect can sufficiently be obtained when used for preparing a resin composition and that the olefin-based resins are inexpensive. Examples of the olefin-based resin include general purpose resins such as polyethylene-based resins, polypropylene-based resins, vinyl chloride resins, styrene resins, (meth)acrylic resins, and vinyl ether resins. These thermoplastic resins may be used alone or may be used as a mixed resin of two or more thereof. Among the olefin-based resins, polyethylene-based resins (PE) such as high density polyethylene (HDPE), low density polyethylene (LDPE), and bio-polyethylene, polypropylene resins (PP), vinyl chloride resins, styrene resins, (meth)acrylic resins, and vinyl ether resins, etc. are preferable because these resins have advantages that the stiffening effect can sufficiently be obtained when used for preparing a resin composition and that these resins are inexpensive.

EXAMPLES

Hereinafter, the present invention will be described in more detail giving Examples and Comparative Examples, however the present invention is not limited to Examples. Hereinafter, "parts" and "%" are on a mass-basis unless otherwise noticed.

[Production Example 1] (Synthesis of Polymer Dispersant-1)

Into a reaction apparatus equipped with a stirrer, a reflux condenser, a thermometer, and a nitrogen introducing pipe, 106 parts of dimethyl diglycol (hereinafter, abbreviated as DMDG), 70 parts of dicyclopentenyloxyethyl methacrylate (hereinafter, abbreviated as DCPOEMA), 1.0 part of iodine, 0.2 parts of diphenylmethane (hereinafter, abbreviated as DPM), and, as a polymerization initiator, 5.0 parts of 2,2'-azobis (4-methoxy-2,4-dimethylvaleronitrile) (trade name: V-70, manufactured by Wako Pure Chemical Industries, Ltd.) were added. The resultant mixture was then stirred and heated to 40° C. with a mantle heater while a nitrogen gas was introduced in the mixture. Polymerization was conducted for 7 hours while the reaction system was held at 40° C., and thus a polymer block A was obtained. The progress status of polymerization was calculated from the solid concentration in the reaction system to find that the polymerization rate was 85%. Moreover, the molecular weight was calculated by gel permeation chromatography (GPC) measurement using a THF solvent to find that the number average molecular weight (hereinafter, abbreviated as Mn) was 4900 and the weight average molecular weight (hereinafter, abbreviated as Mw) was 6500. The molecular weight distribution (hereinafter, abbreviated as PDI) was 1.33. The polymer block A obtained above functions as a resin-affinitive segment as will be described later.

Subsequently, 30 parts of 2-hydroxyethyl methacrylate (hereinafter, abbreviated as HEMA) were added to the reaction system, and polymerization was conducted at 40° C. for 4 hours to form a polymer block B. The polymer block B functions as a cellulose-adsorptive segment. The progress status of polymerization was calculated from the solid concentration in the reaction system to find that the total polymerization rate was 98%. Moreover, the molecular weight, etc. were measured by GPC to find that Mn was 7600, Mw was 10600, and the PDI value was 1.40 for the whole block copolymer.

Subsequently, 200 parts of the polymerization solution obtained in the manner as described above were put into 200 parts of a water/methanol mixed liquid (water:methanol=3: 1), and thus a polymer dispersant was precipitated and then filtered. The polymer dispersant was additionally washed and filtered with 200 parts of a water/methanol mixed liquid (water:methanol=3:1) two times, and the resultant polymer dispersant was dried at 80° C. to obtain 92 parts of polymer dispersant-1 consisting of an A-B block copolymer.

[Production Example 2] (Synthesis of Polymer Dispersant-2)

Polymerization was conducted in the same manner as in Production Example 1 except that, 70 parts of methyl methacrylate (hereinafter, abbreviated as MMA) were used instead of using 70 parts of DCPOEMA in the synthesis of polymer dispersant-1 and that 106 parts of propylene glycol propyl ether (hereinafter, abbreviated as PFG) were used instead of using 106 parts of DMDG in the synthesis of polymer dispersant-1. As a result, with respect to a segment that was intended to function as the resin-affinitive segment A and that was obtained through polymerization of MMA, the polymerization rate was 86%, Mn was 5900, Mw was 8100, and the PDI value was 1.37. In polymerization of HEMA, the polymerization intended for a polymerized product to function as the cellulose-adsorptive segment B, viscosity increase occurred, and therefore the polymerization solution was diluted by additionally adding 56 parts of PFG for dilution. The polymerization rate was 99%, Mn was 8500, Mw was 12000, and the PDI value was 1.41 for the whole block copolymer. Precipitation and washing with a water/methanol mixed liquid, and drying were conducted in the same manner as in Production Example 1 to obtain 90 parts of polymer dispersant-2 consisting of an A-B block copolymer.

[Production Example 3] (Synthesis of Polymer Dispersant-3)

Polymerization was conducted in the same manner as in Production Example 1 except that 10 parts of HEMA and 20 parts of methoxyethyl methacrylate (hereinafter, abbreviated as MOEMA) were used instead of using 30 parts of HEMA in the synthesis of polymer dispersant-1. As a result, in the polymerization of DCPOEMA, the polymerization intended for a polymerized product to function as the resin-affinitive segment A, the polymerization rate was 83%, Mn was 4700, Mw was 6300, and the PDI value was 1.34. Moreover, in the polymerization of HEMA/MOEMA, the polymerization intended for a polymerized product to function as the cellulose-adsorptive segment B, the polymerization was 97.0%, Mn was 7000, Mw was 9900, and the PDI value was 1.41 for the whole A-B block copolymer. Precipitation and washing with a water/methanol mixed liquid, and drying were conducted in the same manner as in Production Example 1 to obtain 93 parts of polymer dispersant-3 consisting of an A-B block copolymer.

[Production Example 4] (Synthesis of Polymer Dispersant-4)

A polymer block A was obtained in the same manner as in Example 1 except that the polymerization time was changed to 9 hours. With respect to the polymer block A, the polymerization rate was 100%, the number average molecular weight was 5600, and PDI was 1.40. Subsequently, 30 parts of HEMA and 13.3 parts of propylene glycol monopropyl ether containing 30% by mass of methacryloyloxyethyl benzyl trimethyl ammonium chloride (MOEBAC) were added to the reaction mixture, and the resultant mixture was subjected to polymerization. The molecular weight, etc. of the obtained polymerized product were measured changing the measurement system from GPC using a THF solvent to GPC using as an eluent a dimethylformamide solution containing 10 mL/L of lithium bromide to find that the polymerization rate was almost 100%, the number average molecular weight was 8200, and PDI was 1.40. With respect to the polymer block B, the calculated number average molecular weight was 2600, the content of the methacrylate-based monomer having a hydroxy group was 88.2% by mass, and the content of the monomer having an ionic group was 11.8%.

Monomer compositions and properties for polymer dispersants 1 to 4 obtained in the manner as described above are shown together in Table 1. Mn of the block B being a CNF-adsorptive segment was calculated as a value obtained by subtracting Mn of the block A from the Mn value of the block A-B. The results are shown in Table 1.

TABLE 1

Monomer compositions and properties of polymer dispersants

| | Monomer composition Block A-b-Block B (mass ratio) | Resin-affinitive block A | | CNF-adsorptive block B | A-B block copolymer | |
|---|---|---|---|---|---|---|
| | | Mn | PDI | Mn | Mn | PDI |
| Polymer dispersant-1 (Production Example-1) | DCPOEMA-b-HEMA (70-b-30) | 4900 | 1.33 | 2700 | 7600 | 1.40 |
| Polymer dispersant-2 (Production Example-2) | MMA-b-HEMA (70-b-30) | 5900 | 1.37 | 2600 | 8500 | 1.42 |
| Polymer dispersant-3 (Production Example-3) | DCPOEMA-b-HEMA/MOEMA (70-b-10/20) | 4700 | 1.34 | 2300 | 7000 | 1.41 |
| Polymer dispersant-4 (Production Example-4) | DCPOEMA-b-HEMA/MOEBAC (66-b-30/4) | 5600 | 1.40 | 2600 | 8200 | 1.40 |

[Production Example 5] (Preparation of Cellulose Nanofiber (CNF))

First of all, 19400 parts of water were added to 600 parts of softwood bleached kraft pulp (NBKP) (refiner treated, solid content: 25%) to prepare an aqueous suspension liquid (slurry) having a pulp slurry concentration of 0.75% by mass. Subsequently, the obtained slurry was subjected to mechanical defibration treatment using a bead mill. After the defibration treatment was completed, the slurry was dehydrated with a filter press to obtain 570 parts of CNF-1 (solid content: 25%) in a water-containing state.

[Example 1] (Preparation of Aqueous Dispersion Treatment Agent Solution-a Containing 10% by Mass of Polymer Dispersant-1)

In 25 parts of DMDG, 10 parts of polymer dispersant-1 prepared previously were dissolved, 0.2 parts of oleylamine acetate as a surface active agent were then added thereto, and 64.8 parts of water were subsequently dropped thereto while the resultant mixture was uniformly stirred to obtain 100 parts of aqueous treatment agent solution-a containing 10% by mass of polymer dispersant-1. In solution-a thus obtained, polymer dispersant-1 was dispersed in a light-yellowish clouded state, and even when the solution was left to stand for 24 hours, sedimentation was not observed.

[Example 2] (Preparation of Aqueous Dispersion Treatment Agent Solution-b Containing 10% by Mass of Polymer Dispersant-2)

In the same manner as in Example 1 except that polymer dispersant-2 prepared previously was used in place of polymer dispersant-1 used in Example 1, 100 parts of aqueous dispersion treatment agent solution-b containing 10% by mass of polymer dispersant-2 were obtained. In solution-b thus obtained, polymer dispersant-2 was dispersed in a white clouded state, and even when the solution was left to stand for 24 hours, sedimentation was not observed.

[Example 3] (Preparation of Aqueous Dispersion Containing Polymer Dispersant-4)

Polymer dispersant-4 prepared previously was used in place of polymer dispersant-1 used in Example 1, and 5.2 parts of an aqueous solution containing 10% of oleylamine acetate and 800 parts of water were gradually added to 200 parts of the resin solution under high-speed stirring with a disper to obtain a bluish white aqueous dispersion. The aqueous dispersion was so stable that sedimentation was not observed at all even when the aqueous dispersion was stored for a long period of time.

[Comparative Example-1] (Preparation of DMDG Solution Containing 10% by Mass of Polymer Dispersant-1)

In 89.8 parts of DMDG, 10 parts of polymer dispersant-1 prepared previously and, as a surface active agent, 0.2 parts of oleylamine acetate were placed together and dissolved to obtain 100 parts of a DMDG solution containing 10% by mass of polymer dispersant-1. The DMDG solution thus obtained was a light-yellowish transparent liquid.

[Comparative Example 2] (Preparation of Aqueous Dispersant Solution-c Containing 10% by Mass of Polymer Dispersant-1/Without Using Surface Active Agent)

In the same manner as in Example 1 except that 0.2 parts of oleylamine acetate were not added, namely a surface active agent was not used, 100 parts of aqueous dispersant solution-c containing 10% by mass of polymer dispersant-1 were obtained. Aqueous dispersant solution-c thus obtained was in a white clouded state, however polymer dispersant-1 became separated and settled after the solution was left to stand for 1 hour.

[Example 4] (Preparation of Aqueous Dispersion Treatment Agent Solution-d Containing 10% by Mass of Polymer Dispersant-1/Using Anionic Surface Active Agent)

In the same manner as in Example 1 except that 10 parts of polymer dispersant-1 prepared previously and, as a surface active agent, 0.2 parts of dodecylbenzenesulfonic acid were used, 100 parts of aqueous dispersion treatment agent solution-d containing 10% by mass of polymer dispersant-1 were obtained. In solution-d thus obtained, polymer dispersant-1 was dispersed in a light-yellowish clouded state, and sedimentation was hardly observed even when the solution was left to stand for a few days.

[Example 5] (Preparation of Aqueous Dispersion Treatment Agent Solution-e Containing 10% by Mass of Polymer Dispersant-3)

In the same manner as in Example 1 except that polymer dispersant-3 prepared previously was used in place of polymer dispersant-1, 100 parts of aqueous dispersion treatment agent solution-e containing 10% by mass of polymer dispersant-3 were obtained. In solution-e thus obtained, polymer dispersant-3 was dispersed in a white clouded state, however sedimentation was slightly observed when the solution was left to stand for a few days.

[Example 6] (Treatment of Cellulose with Aqueous Dispersion Treatment Agent Solution-a and Preparation of Resin Composition-a)

To 40 parts of previously prepared CNF-1 (solid content: 25%) in a water-containing state, 100 parts of aqueous dispersion treatment agent solution-a containing 10% by mass of polymer dispersant-1, the solution-a obtained in Example 1, were added and sufficiently mixed to obtain a readily dispersible cellulose composition in which cellulose was treated with polymer dispersant-1. Subsequently, to the readily dispersible cellulose composition thus obtained, 80 parts of a fine particle polyethylene (Flow Beads HE-3040 (trade name) manufactured by Sumitomo Seika Chemicals Co., Ltd., hereinafter abbreviated as "fine particle PE") were added in a state where the fine particle polyethylene was wetted with 50 parts of water, and the cellulose composition and the fine particle PE were mixed. Further, the resultant mixture was filtered and dried to obtain 98 parts of cellulose-dispersed resin composition-a being a mixed composition of: CNF-1 which was treated with polymer dispersant-1; and a fine particle PE.

[Example 7] (Treatment of Cellulose with Aqueous Dispersion Treatment Agent Solution-b and Preparation of Resin Composition-b)

In the same manner as in Example 6 except that aqueous dispersion treatment agent solution-b containing 10% by mass of polymer dispersant-2, the solution-a obtained in Example 2, was used in place of aqueous dispersion treatment agent solution-a containing polymer dispersant-1, the solution-a used in Example 6, 98 parts of cellulose-dispersed resin composition-b being a mixed composition containing: CNF-1 which was treated with polymer dispersant-2; and a fine particle PE were obtained.

[Comparative Example 3] (Treatment of Cellulose with DMDG Solution of Comparative Example Containing Polymer Dispersant-1 and Preparation of Resin-Mixed Composition)

To 40 parts of previously prepared CNF-1 (solid content: 25%) in a water-containing state, 100 parts of the DMDG solution containing 10% by mass of polymer dispersant-1, the solution obtained in Comparative Example 1, were added and sufficiently mixed. Subsequently, 800 parts of ethanol were added to the mixture, and the resultant mixture was mixed and then filtered. Furthermore, 80 parts of a fine particle PE that was the same as the one used in Example 6 and that was in a state where the fine particle PE was wetted with 800 parts of ethanol were added to the solid matter left after filtration and the resultant mixture was filtered to remove residual DMDG from the mixture. The mixture was then dried to remove ethanol and water in the mixture to obtain 99 parts of a resin-mixed composition of Comparative Example, the composition being a mixed composition containing: CNF-1 which was treated with the DMDG solution containing polymer dispersant-1; and a fine particle PE.

[Comparative Example 4] (Treatment of Cellulose with Aqueous Dispersant Solution-c of Comparative Example 2 and Preparation of Resin Composition-c)

In the same manner as in Example 6 except that aqueous dispersant solution-c containing 10% by mass of polymer dispersant-1, the solution-c obtained in Comparative Example 2, was used in place of aqueous dispersion treatment agent solution-a containing polymer dispersant-1, the solution-a used in Example 6, 98 parts of cellulose-dispersed resin composition-c being a mixed composition containing: CNF-1 which was treated with polymer dispersant-1; and a fine particle PE.

[Example 8] (Treatment of Cellulose with Aqueous Dispersion Treatment Agent Solution-d Containing Polymer Dispersant-1 and Preparation of Resin Composition-d)

In the same manner as in Example 6 except that aqueous dispersion treatment agent solution-d containing 10% by mass of polymer dispersant-1, the solution-d prepared in Example 3, was used in place of aqueous dispersion treatment agent solution-a containing polymer dispersant-1, the solution-a used in Example 6, 98 parts of cellulose-dispersed resin composition-d being a mixed composition containing: CNF-1 which was treated with polymer dispersant-1; and a fine particle PE were obtained.

[Example 9] (Treatment of Cellulose with Aqueous Dispersion Treatment Agent Solution-e Containing Polymer Dispersion Treatment Agent-3 and Preparation of Resin Composition-e)

In the same manner as in Example 6 except that aqueous dispersion treatment agent solution-e containing 10% by mass of polymer dispersant-3, the solution-e prepared in Example 5, was used in place of aqueous dispersion treatment agent solution-a containing polymer dispersant-1, the solution-a used in Example 6, 99 parts of cellulose-dispersed resin composition-e being a mixed composition containing: CNF-1 which was treated with polymer dispersant-3; and a fine particle PE were obtained.

[Evaluation-1] (Twin-Screw Extrusion Kneading, Injection Molding, and Tensile Test)

Evaluation of twin-screw extrusion kneading, injection molding, and tensile elasticity and tensile strength by a tensile test was conducted by the method described below for each of the mixed compositions of CNF-1 and a fine particle PE obtained in Examples 5 to 8 and Comparative Examples 3 and 4. Specifically, twin-screw extrusion kneading was conducted at a kneading temperature of 140° C. for respective mixed compositions, and the respective kneaded products were ejected in a strand form, cooled, and cut with a pelletizer to prepare respective PE resin pellets containing CNF-1 dispersed therein. Further, injection molding was conducted using each of the obtained PE resin pellets containing CNF-1 dispersed therein to prepare a dumbbell-shaped test piece (thickness of dumbbell: 2 mm), and each of the dumbbell-shaped test pieces was used as a sample for evaluation. Tensile test was conducted for each of the obtained dumbbell-like test pieces as a sample for evaluation with a tensile tester (manufactured by Instron: universal testing instruments 5900 series) at a tensile speed of 10 mm/min to measure and evaluate the tensile elasticity and tensile strength. The results are shown together in Table 2.

[Example 10] (Treatment of Cellulose with Aqueous Dispersion Treatment Agent Solution-a and Preparation of Resin Composition-a'/Without Drying)

To 40 parts of previously prepared CNF-1 (solid content: 25%) in a water-containing state, 100 parts of aqueous dispersion treatment agent solution-a containing 10% by mass of polymer dispersant-1, the solution-a obtained in Example 1, were added and sufficiently mixed to obtain a readily dispersible cellulose composition in which cellulose was treated with polymer dispersant-1. Subsequently, 80 parts of a fine particle PE in a state where the fine particle PE was wetted by 50 parts of water were added to the obtained easily dispersible cellulose composition, and the resultant mixture was stirred. The resultant mixture was filtered to obtain, without conducting drying, 150 parts of cellulose-dispersed resin composition-a' being a mixed composition containing: CNF-1 which was treated with polymer dispersant-1; and the fine particle PE, the resin composition-a' containing a liquid component, were obtained.

[Evaluation-2] (Twin-Screw Extrusion Kneading, Injection Molding, and Tensile Test)

A PE resin pellet containing CNF-1 dispersed therein was prepared as a sample for evaluation using cellulose-dispersed resin composition-a', which was obtained in Example 9, basically in the same manner as prepared in Evaluation-1 previously described. Specifically, twin-screw extrusion kneading was conducted at a kneading temperature of 140° C. while bent holes were open for removing a liquid component in cellulose-dispersed resin composition-a', and the kneaded product was ejected in a strand form, cooled, and cut with a pelletizer to prepare a PE resin pellet containing CNF-1 dispersed therein. Measurement and evaluation of tensile elasticity and tensile strength were conducted for the obtained sample for evaluation in the same manner as in evaluation-1 previously described except the above described preparation of the PE resin pellet. The evaluation results of the mechanical properties were shown together in Table 2.

TABLE 2

Evaluation results

| | Composition (mass ratio) | Aqueous solution of polymer dispersant used | Evaluation results of mechanical properties | |
|---|---|---|---|---|
| | | | Tensile elasticity (GPa) | Tensile strength (MPa) |
| CNF-dispersed PE-a (Example 6) | Polymer dispersant-1/CNF/PE (10/10/80) | Aqueous dispersion treatment agent solution-a containing polymer dispersant-1 | 2.65 | 40.0 |
| CNF-dispersed PE-b (Example 7) | Polymer dispersant-2/CNF/PE (10/10/80) | Aqueous dispersion treatment agent solution-b containing polymer dispersant-2 | 2.57 | 39.6 |
| CNF-dispersed PE-a' (Example 10) | Polymer dispersant-1/CNF/PE (10/10/80) | Aqueous dispersion treatment agent solution-a containing polymer dispersant-1 | 2.72 | 41.1 |
| CNF-PE mixture (Comparative Example 3) | Polymer dispersant-1/CNF/PE (10/10/80) | DMDG solution containing polymer dispersant-1 | 1.67 | 31.6 |
| CNF-dispersed PE-c (Comparative Example 4) | Polymer dispersant-1/CNF/PE (10/10/80) | Aqueous dispersion solution-c containing polymer dispersant-1 | 1.80 | 33.5 |
| CNF-dispersed PE-d (Example 8) | Polymer dispersant-1/CNF/PE (10/10/80) | Aqueous dispersion treatment agent solution-d containing polymer dispersant-1 | 2.15 | 36.3 |
| CNF-dispersed PE-e (Example 9) | Polymer dispersant-3/CNF/PE (10/10/80) | Aqueous dispersion treatment agent solution-e containing polymer dispersant-3 | 2.10 | 35.3 |

As described above, mixed compositions of Examples 6 to 10 each containing dispersed cellulose and a PE resin, the mixed compositions obtained using each of aqueous dispersion treatment agents of Examples according to the order of addition as specified in the present invention, showed a high tensile elasticity value and a high tensile strength value when tested preparing evaluation samples therefrom. In the mixed compositions, aqueous dispersion treatment agents of Examples 6 to 10 were obtained each using a surface active agent and following the addition of order thereof as specified in the present invention. Especially in the cases where a cationic surface active agent was used, higher values were obtained, and in the cases where an aqueous dispersion treatment agent containing a polymer dispersant is prepared, use of a cationic surface active agent was especially effective. Moreover, in Example 10, when twin-screw extrusion kneading was conducted while the liquid component was contained, further improvement in mechanical strength was confirmed. To the contrary, in Comparative Example 3 using a solution obtained by adding to cellulose an organic solvent solution of Comparative Example 1 in which a surface active agent and a polymer dispersant were put in together, the polymer dispersant became in a precipitated state and was not able to be adsorbed effectively to cellulose because the organic solvent solution was added as it was to cellulose in a water-containing state. Moreover, it is considered that the resin composition had poor mechanical properties because aggregation of cellulose occurred due to the organic solvent. Further, the process conducted in Comparative Example 3 cannot be said that to be a preferable process from the standpoint of using a large amount of an organic solvent. Furthermore, in Comparative Example 4 where a surface active agent was not added, it is considered that the mechanical properties were poor similarly to the above described case because a surface active agent was not used and therefore the polymer dispersant in the aqueous dispersion treatment agent became in a precipitated state and was not adsorbed effectively to cellulose even though the cellulose was treated with the polymer dispersant in a system containing water as a main medium. From what has been described above, it has been confirmed that the process in which a polymer dispersant is applied after preparing a dispersion treatment agent from the polymer dispersant using a surface active agent as specified in the present invention is effective as a treatment process by which an effect of a polymer dispersant to a hydrophilic fine cellulose powder can be exhibited even though water is used as a main medium. Furthermore, from the comparison of Examples 6 and 7 with Example 9, when the polymer dispersant where part of hydroxy groups in the cellulose-adsorptive segment B thereof were replaced by a methoxy structure was used, it has been confirmed that the resin composition using such a polymer dispersant is inferior both in tensile elasticity and tensile strength. From this result, it has been proven that, as a polymer dispersant suitable for cellulose, a polymer dispersant having a block structure having a hydroxy group as a cellulose adsorptive component is more effective.

INDUSTRIAL APPLICABILITY

The present invention provides a process for preparing a readily dispersible cellulose composition by adding to cellulose an aqueous dispersion treatment agent containing a polymer dispersant and using a surface active agent according to the specific order of addition. By conducting the process, for example, as a pretreatment process for preparing a cellulose-dispersed PE resin, a cellulose dispersed resin composition to be obtained causes no problem that is brought about by using a large amount of organic solvents and has a property by which shaped products thereof is excellent in tensile elasticity and tensile strength. Therefore, the cellulose-dispersed resin composition provided according to the present invention is useful in structural material applications including automobile members, main frames for electric appliances such as TV sets, telephones, and time pieces, main frames for mobile communication devices such as cell phones, and main frames for printing devices, copiers, and sporting goods, etc.

The invention claimed is:

1. A process for producing a readily dispersible cellulose composition having an improved dispersibility of cellulose in a resin, the process comprising:
dissolving a polymer dispersant having a block copolymer structure comprising a resin-affinitive segment A and a cellulose-adsorptive segment B in a hydrophilic organic solvent solution;
adding a surface active agent to the resultant solution;
thereafter adding water to the resultant mixture to prepare an aqueous dispersion treatment agent comprising the polymer dispersant; and
adding the obtained aqueous dispersion treatment agent to cellulose in a water-containing state or in a dry state, thereby obtaining a readily dispersible cellulose composition.

2. The process for producing a readily dispersible cellulose composition according to claim 1, wherein the surface active agent is at least any one selected from the group consisting of a carboxylic acid salt, an inorganic acid salt, and a quaternary ammonium salt of aliphatic amines.

3. The process for producing a readily dispersible cellulose composition according to claim 1, wherein the hydrophilic organic solvent is an alcohol-based solvent or a glycol-based solvent.

4. The process for producing a readily dispersible cellulose composition according to claim 1, wherein the cellulose is at least one cellulose fiber in a water-containing state or in a dry state, the cellulose fiber selected from the group consisting of a cellulose nanofiber, a cellulose nanocrystal, pulp, lignocellulose, and wood flour.

5. The process for producing a readily dispersible cellulose composition according to claim 1, wherein the polymer dispersant further satisfies all of the following requirements (1) to (5):
(1) 90% by mass or more of constituents of the A-B block copolymer is constituted by a methacrylate-based monomer or methacrylate-based monomers;
(2) 50% by mass or more of constituents of the cellulose-adsorptive segment B is constituted by a methacrylate-based monomer having one or more hydroxy groups and/or a methacrylate-based monomer having a urea group, and the cellulose-adsorptive segment B does not have compatibility with resins;
(3) the resin-affinitive segment A has a number average molecular weight of 500 to 20000 in terms of polystyrene in gel permeation chromatography, and a ratio of the resin-affinitive segment A in the whole A-B block copolymer is 5 to 95% by mass;
(4) the cellulose-adsorptive segment B has a number average molecular weight of 500 to 20000 in terms of polystyrene in gel permeation chromatography, and a ratio of the cellulose-adsorptive segment B in the whole A-B block copolymer is 5 to 95% by mass; and
(5) the A-B block copolymer has a number average molecular weight of 1000 to 40000 in terms of polystyrene in gel permeation chromatography and a molecular weight distribution index (weight average molecular weight/number average molecular weight) of 1.0 to 1.6.

6. The process for producing a readily dispersible cellulose composition according to claim 5, wherein, in the requirement (2), 70% by mass or more of the constituents of the cellulose-adsorptive segment B is constituted by a methacrylate-based monomer having one or more hydroxy groups and/or a methacrylate-based monomer having a urea group, and 3 to 15% by mass of the constituents of the cellulose-adsorptive segment B is constituted by a methacrylic acid neutralized with an alkali and/or a methacrylate-based monomer having a carboxy group neutralized with an alkali, or constituted by a methacrylate-based monomer having a quaternary ammonium salt group.

7. The process for producing a readily dispersible cellulose composition according to claim 5, wherein the polymer dispersant is synthesized through a reversible chain transfer catalyzed polymerization (RTCP) method being a living radical polymerization method: using an organic iodine compound as an initiation compound; and using a phosphorus compound, a nitrogen compound, an oxygen compound, or a carbon compound as a catalyst.

8. A readily dispersible cellulose composition obtained through the process for producing a readily dispersible cellulose composition according to claim 1.

9. A cellulose-dispersed resin composition obtained through melt-kneading of a resin composition comprising the readily dispersible cellulose composition according to claim 8 and a resin.

10. The cellulose-dispersed resin composition according to claim 9, wherein the resin composition is obtained through melt-kneading conducted in a state where a liquid component derived from the readily dispersible cellulose composition is contained.

11. The cellulose-dispersed resin composition according to claim 9, wherein the resin is a thermoplastic resin.

12. A process for producing an aqueous dispersion treatment agent for use in producing a readily dispersible cellulose composition having an improved dispersibility of cellulose in a resin, the process comprising:
dissolving a polymer dispersant having a block copolymer structure comprising a resin-affinitive segment A and a cellulose-adsorptive segment B in a hydrophilic organic solvent solution;
adding a surface active agent to the resultant solution; and
thereafter adding water to the resultant mixture, thereby producing an aqueous dispersion treatment agent comprising the polymer dispersant.

* * * * *